(12) United States Patent
Krishnamurthy et al.

(10) Patent No.: US 10,134,053 B2
(45) Date of Patent: Nov. 20, 2018

(54) USER ENGAGEMENT-BASED CONTEXTUALLY-DEPENDENT AUTOMATED PRICING FOR NON-GUARANTEED DELIVERY

(71) Applicant: Excalibur IP, LLC, New York, NY (US)

(72) Inventors: Prabhakar Krishnamurthy, Pleasanton, CA (US); Xing Yi, Milpitas, CA (US); Yan Jiao, London (GB); Jean-Marc Langlois, Menlo Park, CA (US)

(73) Assignee: EXCALIBUR IP, LLC, New York, NY (US)

( * ) Notice: Subject to any disclaimer, the term of this patent is extended or adjusted under 35 U.S.C. 154(b) by 977 days.

(21) Appl. No.: 14/084,412

(22) Filed: Nov. 19, 2013

(65) Prior Publication Data

US 2015/0142557 A1 May 21, 2015

(51) Int. Cl.
G06Q 30/00 (2012.01)
G06Q 30/02 (2012.01)

(52) U.S. Cl.
CPC ..... G06Q 30/0246 (2013.01); G06Q 30/0241 (2013.01); G06Q 30/0283 (2013.01)

(58) Field of Classification Search
None
See application file for complete search history.

(56) References Cited

U.S. PATENT DOCUMENTS 6,078,866 A 6/2000 Buck et al.
6,269,361 B1 7/2001 Davis et al.
(Continued)

FOREIGN PATENT DOCUMENTS

CN 101075908 A 11/2007
CN 101169842 4/2008
(Continued)

OTHER PUBLICATIONS

Examination Opinion and English Translation dated Dec. 28, 2017 in Taiwanese Patent Application No. 103139715.
(Continued)

Primary Examiner — Matthew T Sittner
(74) Attorney, Agent, or Firm — Brinks Gilson & Lione

(57) ABSTRACT

A method for adjusting pricing for advertisements of non-guaranteed delivery ("NDG") advertising auctions includes retrieving dwell time information for users that engage advertisements streamed to the users in a display content stream. The method aggregates the advertisements into different groups according to display context (such as advertisement category, viewing device, product in which the advertisement is streamed, etc.) and computes short-click ratios of advertisements in each group based on a short-click threshold assigned to the group and the user dwell time information for the group. The method further determines average dwell time by users on advertisements in respective groups. The method adjusts pricing of the advertisements of a group for NGD bidding based on the short-click ratio and average dwell time of the group, to favor groups having higher dwell times and lower short-click ratios. Prices may be dynamically adjusted across different contexts based on user engagement information.

11 Claims, 10 Drawing Sheets

(56) References Cited

U.S. PATENT DOCUMENTS

| | | |
|---|---|---|
| 6,401,075 B1 | 6/2002 | Mason et al. |
| 6,446,061 B1 | 9/2002 | Doerre et al. |
| 6,484,148 B1 | 11/2002 | Boyd |
| 6,711,585 B1 | 3/2004 | Copperman et al. |
| 6,712,702 B2 | 3/2004 | Goldberg et al. |
| 6,826,572 B2 | 11/2004 | Colace et al. |
| 6,978,263 B2 | 12/2005 | Soulanille et al. |
| 7,035,812 B2 | 4/2006 | Meisel et al. |
| 7,062,510 B1 | 6/2006 | Eldering |
| 7,065,500 B2 | 6/2006 | Singh et al. |
| 7,076,479 B1 | 7/2006 | Cheung et al. |
| 7,100,111 B2 | 8/2006 | McElfresh et al. |
| 7,136,875 B2 | 11/2006 | Anderson et al. |
| 7,162,480 B2 | 1/2007 | Vishik |
| 7,225,182 B2 | 5/2007 | Paine et al. |
| 7,231,358 B2 | 6/2007 | Singh et al. |
| 7,299,194 B1 | 11/2007 | Manganaris et al. |
| 7,447,677 B2 | 11/2008 | Millican et al. |
| 7,454,409 B2 | 11/2008 | Roy et al. |
| 7,496,943 B1 | 2/2009 | Goldberg et al. |
| 7,814,085 B1 | 10/2010 | Pfleger et al. |
| 7,882,046 B1 | 2/2011 | Kizhakkekalathil et al. |
| 7,941,340 B2 | 5/2011 | Doemling et al. |
| 8,091,031 B2 | 1/2012 | Evans |
| 8,117,067 B2 | 2/2012 | Ketchum |
| 8,234,158 B1 | 7/2012 | Sun et al. |
| 8,321,274 B2 | 11/2012 | Collins et al. |
| 8,463,783 B1 | 6/2013 | Yagnik |
| 8,554,618 B1 | 10/2013 | Gasch |
| 8,572,109 B1 * | 10/2013 | Hodge .............. G06F 17/30265 706/12 |
| 8,577,910 B1 * | 11/2013 | Hodge .............. G06F 17/30669 706/11 |
| 8,660,895 B1 * | 2/2014 | Saurabh ............. G06Q 30/0242 705/14.42 |
| 8,768,960 B2 | 7/2014 | Hu |
| 8,788,338 B1 | 7/2014 | Ruiz et al. |
| 8,868,565 B1 * | 10/2014 | Zhong .............. G06F 17/30707 707/740 |
| 9,135,292 B1 | 9/2015 | Tsun et al. |
| 9,460,451 B2 | 10/2016 | Ruiz et al. |
| 2001/0034762 A1 | 10/2001 | Jacobs et al. |
| 2001/0044837 A1 | 11/2001 | Talib et al. |
| 2002/0078192 A1 | 6/2002 | Kopsell et al. |
| 2002/0082923 A1 | 6/2002 | Merriman et al. |
| 2002/0107735 A1 | 8/2002 | Henkin |
| 2002/0120516 A1 * | 8/2002 | Sakagami ............. G06Q 30/02 705/14.25 |
| 2002/0147570 A1 | 10/2002 | Kraft et al. |
| 2003/0046148 A1 | 3/2003 | Rizzi et al. |
| 2003/0101126 A1 | 5/2003 | Cheung et al. |
| 2004/0015401 A1 | 1/2004 | Lee et al. |
| 2004/0059708 A1 | 3/2004 | Dean et al. |
| 2004/0103024 A1 | 5/2004 | Patel et al. |
| 2004/0158858 A1 | 8/2004 | Paxton |
| 2004/0181525 A1 | 9/2004 | Itzhak et al. |
| 2004/0186769 A1 | 9/2004 | Mangold et al. |
| 2004/0243466 A1 | 12/2004 | Trzybinski et al. |
| 2004/0267725 A1 | 12/2004 | Harik |
| 2005/0028188 A1 | 2/2005 | Latona et al. |
| 2005/0033641 A1 | 2/2005 | Jha et al. |
| 2005/0033771 A1 | 2/2005 | Schmitter et al. |
| 2005/0066361 A1 * | 3/2005 | Iijima .................... G06Q 30/02 725/42 |
| 2005/0076014 A1 | 4/2005 | Agarwal et al. |
| 2005/0080775 A1 | 4/2005 | Colledge et al. |
| 2005/0149395 A1 | 7/2005 | Henkin et al. |
| 2005/0165638 A1 | 7/2005 | Piller |
| 2005/0187818 A1 | 8/2005 | Zito et al. |
| 2005/0216448 A1 | 9/2005 | Talib et al. |
| 2005/0228797 A1 | 10/2005 | Koningstein et al. |
| 2005/0261994 A1 | 11/2005 | Lawe |
| 2005/0267872 A1 | 12/2005 | Galai et al. |
| 2006/0010105 A1 | 1/2006 | Sarukkai et al. |
| 2006/0105841 A1 | 5/2006 | Rom et al. |
| 2006/0111971 A1 | 5/2006 | Salesin et al. |
| 2006/0122994 A1 | 6/2006 | Kapur et al. |
| 2006/0224445 A1 * | 10/2006 | Axe ...................... G06Q 30/02 705/14.69 |
| 2006/0242017 A1 | 10/2006 | Libes et al. |
| 2006/0287920 A1 | 12/2006 | Perkins et al. |
| 2007/0027743 A1 | 2/2007 | Carson et al. |
| 2007/0038602 A1 | 2/2007 | Weyand et al. |
| 2007/0038621 A1 | 2/2007 | Weyand et al. |
| 2007/0073758 A1 | 3/2007 | Perry et al. |
| 2007/0088607 A1 | 4/2007 | Feierbach |
| 2007/0118392 A1 | 5/2007 | Zinn et al. |
| 2007/0143186 A1 | 6/2007 | Apple et al. |
| 2007/0143278 A1 | 6/2007 | Srivastava et al. |
| 2007/0156121 A1 | 7/2007 | Wright et al. |
| 2007/0156514 A1 | 7/2007 | Wright et al. |
| 2007/0156887 A1 | 7/2007 | Wright et al. |
| 2007/0157228 A1 | 7/2007 | Bayer et al. |
| 2007/0174255 A1 | 7/2007 | Sravanapudi et al. |
| 2007/0239530 A1 | 10/2007 | Datar et al. |
| 2007/0265073 A1 | 11/2007 | Novi et al. |
| 2007/0276926 A1 | 11/2007 | Lajoie et al. |
| 2008/0010142 A1 | 1/2008 | O'Brien et al. |
| 2008/0040175 A1 | 2/2008 | Dellovo |
| 2008/0046920 A1 | 2/2008 | Bill |
| 2008/0065624 A1 | 3/2008 | Sun et al. |
| 2008/0082477 A1 * | 4/2008 | Dominowska .... G06F 17/30616 |
| 2008/0086360 A1 | 4/2008 | Kanapur |
| 2008/0086372 A1 | 4/2008 | Madhavan |
| 2008/0086382 A1 | 4/2008 | Ur |
| 2008/0114656 A1 * | 5/2008 | Jersey ................ G06Q 30/0264 705/14.61 |
| 2008/0140524 A1 | 6/2008 | Anand et al. |
| 2008/0140591 A1 | 6/2008 | Agarwal et al. |
| 2008/0201218 A1 | 8/2008 | Broder et al. |
| 2008/0243617 A1 | 10/2008 | Song et al. |
| 2008/0249852 A1 | 10/2008 | Ting et al. |
| 2008/0250447 A1 * | 10/2008 | Rowe ...................... G06Q 30/02 725/32 |
| 2008/0270223 A1 * | 10/2008 | Collins .................. G06Q 30/02 705/14.42 |
| 2008/0294524 A1 | 11/2008 | Badros et al. |
| 2008/0313142 A1 | 12/2008 | Wang et al. |
| 2009/0037257 A1 | 2/2009 | Stuckey et al. |
| 2009/0105096 A1 | 4/2009 | Horowitz |
| 2009/0183112 A1 | 7/2009 | Higgins et al. |
| 2009/0204615 A1 * | 8/2009 | Samame ................ G06Q 30/02 |
| 2009/0254512 A1 | 10/2009 | Broder et al. |
| 2009/0282022 A1 | 11/2009 | Bennett |
| 2009/0327032 A1 | 12/2009 | Gunawardana et al. |
| 2010/0005000 A1 | 1/2010 | McKinzie |
| 2010/0058383 A1 | 3/2010 | Chang et al. |
| 2010/0070288 A1 | 3/2010 | Pandey |
| 2010/0082412 A1 * | 4/2010 | Brower .................. G06Q 30/02 705/14.4 |
| 2010/0094881 A1 * | 4/2010 | Brower ............. G06F 17/30867 707/753 |
| 2010/0121694 A1 * | 5/2010 | Bharadwaj ............. G06Q 30/02 705/14.4 |
| 2010/0131333 A1 * | 5/2010 | Ball ...................... G06Q 30/02 705/7.29 |
| 2010/0185689 A1 | 7/2010 | Hu et al. |
| 2010/0198837 A1 * | 8/2010 | Wu .................. G06F 17/30672 707/748 |
| 2010/0217648 A1 | 8/2010 | Agarwal et al. |
| 2011/0029384 A1 | 2/2011 | Wei et al. |
| 2011/0040635 A1 | 2/2011 | Simmons et al. |
| 2011/0054960 A1 | 3/2011 | Bhatia et al. |
| 2011/0055613 A1 * | 3/2011 | Mandyam ......... H04W 52/0258 713/340 |
| 2011/0093339 A1 * | 4/2011 | Morton .................. G06Q 30/02 705/14.58 |
| 2011/0119125 A1 | 5/2011 | Javangula et al. |
| 2011/0125555 A1 * | 5/2011 | Fradkin ............ G06Q 10/06395 705/7.41 |
| 2011/0153423 A1 | 6/2011 | Elvekrog et al. |
| 2011/0219012 A1 | 9/2011 | Yih et al. |

(56) References Cited

U.S. PATENT DOCUMENTS

| | | | |
|---|---|---|---|
| 2011/0231241 A1* | 9/2011 | Kesari | G06F 17/30699 705/14.42 |
| 2011/0264508 A1* | 10/2011 | Harik | G06Q 30/02 705/14.42 |
| 2011/0276389 A1 | 11/2011 | Kulkarni et al. | |
| 2011/0307411 A1* | 12/2011 | Bolivar | G06F 17/30867 705/347 |
| 2011/0313853 A1 | 12/2011 | Ramer et al. | |
| 2011/0313866 A1 | 12/2011 | Park | |
| 2012/0022952 A1 | 1/2012 | Cetin et al. | |
| 2012/0030011 A1* | 2/2012 | Rey | G06Q 30/0242 705/14.43 |
| 2012/0116872 A1 | 5/2012 | Hicken et al. | |
| 2012/0150630 A1 | 6/2012 | Hicken et al. | |
| 2012/0158494 A1 | 6/2012 | Reis et al. | |
| 2012/0158511 A1 | 6/2012 | Lucero et al. | |
| 2012/0158685 A1* | 6/2012 | White | G06F 17/30867 707/706 |
| 2012/0239488 A1 | 9/2012 | Zimmerman et al. | |
| 2012/0271714 A1 | 10/2012 | Farahat et al. | |
| 2012/0271715 A1* | 10/2012 | Morton | G06Q 30/0257 705/14.53 |
| 2012/0310652 A1* | 12/2012 | O'Sullivan | G06F 3/167 704/270.1 |
| 2013/0064527 A1 | 3/2013 | Maharajh et al. | |
| 2013/0103495 A1 | 4/2013 | Cloud | |
| 2013/0124344 A1 | 5/2013 | Kolluri et al. | |
| 2013/0159110 A1 | 6/2013 | Rajaram et al. | |
| 2013/0238449 A1 | 9/2013 | Ferreira et al. | |
| 2013/0246167 A1* | 9/2013 | Qin | G06Q 30/0256 705/14.46 |
| 2013/0246383 A1 | 9/2013 | White et al. | |
| 2013/0325858 A1* | 12/2013 | Xu | G06F 17/30867 707/730 |
| 2014/0019868 A1* | 1/2014 | Varian | G06F 17/30864 715/738 |
| 2014/0067525 A1* | 3/2014 | Soupliotis | G06Q 30/0269 705/14.45 |
| 2014/0067552 A1 | 3/2014 | Krueger | |
| 2014/0173086 A1* | 6/2014 | Carncross | G06Q 30/0242 709/224 |
| 2014/0180829 A1* | 6/2014 | Umeda | G06Q 30/0273 705/14.69 |
| 2014/0223318 A1 | 8/2014 | Pefferle | |
| 2014/0324599 A1 | 10/2014 | Munoz-Torres et al. | |
| 2014/0324604 A1 | 10/2014 | Munoz-Torres et al. | |
| 2014/0351248 A1 | 11/2014 | White et al. | |
| 2015/0006280 A1 | 1/2015 | Ruiz et al. | |
| 2015/0019334 A1* | 1/2015 | Moses | G06Q 30/0251 705/14.54 |
| 2015/0142557 A1* | 5/2015 | Krishnannurthy | G06Q 30/0241 705/14.45 |
| 2015/0154631 A1* | 6/2015 | Umeda | G06Q 30/0243 705/14.42 |
| 2015/0154650 A1* | 6/2015 | Umeda | G06Q 30/0273 705/14.68 |
| 2015/0161255 A1* | 6/2015 | Battle | G06F 17/30864 707/706 |
| 2015/0178790 A1* | 6/2015 | Yi | G06Q 30/0275 705/7.31 |
| 2015/0186939 A1 | 7/2015 | Li et al. | |
| 2015/0248712 A1 | 9/2015 | Lacy-Hulbert et al. | |
| 2015/0254714 A1 | 9/2015 | Zhuang et al. | |
| 2015/0278877 A1 | 10/2015 | Yi et al. | |
| 2016/0217142 A1 | 7/2016 | Ye et al. | |

FOREIGN PATENT DOCUMENTS

| | | |
|---|---|---|
| CN | 101253739 A | 8/2008 |
| CN | 101583964 | 11/2009 |
| CN | 101772768 A | 7/2010 |
| CN | 101826192 A | 9/2010 |
| CN | 102193969 | 9/2011 |
| CN | 102663065 A | 9/2012 |
| CN | 102934139 A | 2/2013 |
| JP | 2006-50469 | 2/2006 |
| JP | 2012-068901 A | 4/2012 |
| KR | 10-2006-0023684 A | 3/2006 |
| KR | 10-2006-0103034 A | 9/2006 |
| KR | 10-2007-0114061 A | 11/2007 |
| KR | 10-2008-0102437 A | 11/2008 |
| KR | 10-2009-0010567 A | 1/2009 |
| KR | 10-2011-0003211 A | 1/2011 |
| KR | 10-2011-0026506 A | 3/2011 |
| KR | 10-2011-0104355 A | 9/2011 |
| TW | 200923718 A | 6/2009 |
| WO | WO 2004/027662 A1 | 4/2004 |
| WO | WO/2007/056445 A2 | 5/2007 |
| WO | WO 2011/112204 A1 | 9/2011 |
| WO | WO 2013/036957 A2 | 3/2013 |

OTHER PUBLICATIONS

Taiwanese Office Action from TW Application No. 103114940, dated Feb. 23, 2016 (10pp.).
Chinese Office Action from corresponding Chinese Application No. 201410177822.7, dated Oct. 8, 2016, 10pgs.
International Report on Patentability and Written Opinion from corresponding international application No. PCT/CN2014/073133, 6pp., dated Sep. 22, 2016.
Summons to Attend Oral Proceedings from corresponding European Application No. 13186468.8, 7pp.Oct. 5, 2016.
Summons to Attend Oral Proceedings from corresponding European Application No. 13186467.0, 7pp., Oct. 4, 2016.
Examination Report from corresponding Taiwanese patent application No. 103113518, 23pp., dated Aug. 16, 2016.
Notice of Last Preliminary Rejection from corresponding Korean patent application No. 10-2014-51443, 3pp., dated Aug. 9, 2016.
Chinese Office Action from corresponding Chinese Application No. 2410178076.3, 9pgs., dated Nov. 30, 2016.
Chinese Office Action from corresponding Chinese application No. CN 201410289137.3, 9pp., dated Feb. 24, 2017.
Extended European Search Report from corresponding European application No. 14193956.1, 3pp., dated Mar. 25, 2015.
Summons to attend oral proceeding from corresponding European application No. 14193956.1, 9pp., Dec. 5, 2016.
Examination Report from corresponding European application No. 13 193 381.4, 6pp., dated Mar. 22, 2017.
Examination Report from corresponding European application No. 13193386.3, 3pp., dated Feb. 13, 2014.
Extended European Search Report from corresponding European application No. 13193381.4, 3pp., dated Jun. 2, 2014.
International Report from corresponding international application No. PCT/CN2014/073133, 2pp., dated Nov. 16, 2014.
Extended Examination Report from corresponding European application No. 15150037.8, 5pp, dated Jun. 2, 2015.
Examination Report from corresponding European application No. 13193386.3, 7pp., dated Mar. 13, 2017.
KIPO's Notice of Preliminary Rejection from corresponding Korean Application No. 10-2014-0051443, 12 pgs., dated Apr. 14, 2017.
Taiwanese Office Action from TW Application No. 103120461, 12pp., dated Oct. 2, 2015.
First Office Action corresponding to Chinese Application No. 201410658175.1 filed on Nov. 18, 2014, 31 pages.
Song, Leyi et al., "Online advertising systems and related technology evolution," Journal of East China Normal University (Natural Science), No. 3, May 2013, 12 pages.
"Research and implementation of personalized advertisement click rate prediction," Published by Beijing University of Posts and Telecommunications, Nov. 15, 2013, 4 pages.
"Facebook offers huge incentives to bolster dwell time and revenue," Econsultancy, http://econsultancy.com/uk/nma-archive/54706-facebook-offers-huge-incentives-to-bolste , 2 pages (Jan. 16, 2012).
McAfee, R. Preston, "The Design of Advertising Exchanges," Review of Industrial Organization. vol. 39, No. 3, 19 pages (2011).

(56) References Cited

OTHER PUBLICATIONS

Rosales, Romer, et al., "Post-Click Conversion Modeling and Analysis for Non-Guaranteed Delivery Display Advertising," paper presented at Web Search and Data Mining conference (WSDM 2012), Feb. 8-12, 2012, Seattle, WA, USA, 10 pages (2012).
Author unknown, HTML5 Digital Classroom, The Role of CSS3 Media Queries, 1p., date of publication unknown.
Cascading Style Sheets, Wikipedia, downloaded Sep. 23, 2015, 26 pgs.
Extended European Search Report from corresponding European application No. EP 13 18 6467, dated Oct. 8, 2015, 7 pgs.
European Search Report from corresponding European application No. EP 13 18 6467, dated Jan. 15, 2015, 8 pgs.
European Search Report to EP Application No. 15150037.8, 1952, dated May 21, 2015 (5p.).
Extended European Search Report from corresponding European application No. EP 13 18 6468.8, dated Oct. 1, 2015, 7 pgs.
International Preliminary Report on Patentability from corresponding International Application No. PCT/US2014/032348 dated Nov. 12, 2015 (8p.).
International Preliminary Report on Patentability from corresponding International Application No. PCT/US2014/032977, dated Nov. 12, 2015 (10p.).
International Search Report and Written Opinion from corresponding International application No. PCT/US2014/032348, dated Aug. 22, 2014, 11 pgs.
International Search Report and Written Opinion from corresponding International application No. PCT/US2014/032977, dated Aug. 20, 2014, 14 pgs.
Notice of Preliminary Rejection with English translation from corresponding Korean Application No. 10-2014-0051443 dated Nov. 17, 2015, 23 pgs.
Notice of Preliminary Rejection with English translation from corresponding Korean Application No. 10-2014-0051489 dated Dec. 1, 2015 , 17 pgs.
Mike Phillips, Place Local's Impressive Local Advertising Solution, May 24, 2010, Website Magazine, 1 pg.
Mobile Device Detection, Wikipedia, downloaded from the Internet on Sep. 23, 2015, 6 pgs.
User Agent, Wikipedia, downloaded from the Internet on Sep. 23, 2015, 8 pgs.
Author unknown, Why IPTV?, date of publication unknown, p. 142.
U.S. Appl. No. 13/872,436, filed Apr. 29, 2013.
U.S. Appl. No. 13/872,453, filed Apr. 29, 2013.
U.S. Appl. No. 13/932,766, filed Jul. 1, 2013.
U.S. Appl. No. 13/932,655, filed Jul. 1, 2013.
U.S. Appl. No. 14/146,637, filed Jan. 2, 2014.
U.S. Appl. No. 14/194,205, filed Feb. 28, 2014.
U.S. Appl. No. 14/242,386, filed Apr. 1, 2014.
U.S. Appl. No. 14/242,252, filed Apr. 1, 2014.

* cited by examiner

FIG. 2B

(12) United States Patent
US 10,134,053 B2

USER ENGAGEMENT-BASED CONTEXTUALLY-DEPENDENT AUTOMATED PRICING FOR NON-GUARANTEED DELIVERY

RELATED APPLICATIONS

The present application relates to applications entitled: "USER ENGAGEMENT BASED NON-GUARANTEED DELIVERY PRICING," filed on Nov. 6, 2013, U.S. patent application Ser. No. 14/073,575, now Abandoned; "PRIORITIZING ITEMS FROM DIFFERENT CATEGORIES IN A NEWS STREAM," filed on Aug. 28, 2013, U.S. patent application Ser. No. 14/012,932, now Abandoned; "DWELL TIME BASED ADVERTISING," filed on Aug. 23, 2013, U.S. patent application Ser. No. 13/975,151, pending; "DISPLAY TIME OF A WEB PAGE," filed on Mar. 15, 2013, U.S. patent application Ser. No. 13/843,433, now U.S. Pat. No. 9,355,078; each of which is incorporated by reference.

BACKGROUND

This application relates to using online user engagement data, such as dwell time and click data, to perform non-guaranteed delivery (NGD) advertisement (ad) pricing, and particularly to adjust pricing of NGD advertisements based on display context within a content stream.

NGD advertising and content include a variety of payment models. Publishers, such as advertisers, can choose to pay per impression, e.g., cost-per-thousand impressions (CPM), of an item of content or advertising, pay per click (CPC) directed at an item of content or advertising, or pay per action (CPA) associated with an item of content or advertising. For example, in the NGD display advertisements market or a stream market, advertisers with different payment types may compete for a same advertisement slot. An auction mechanism for a slot may convert bids associated with these various payment models to a common base model, such as expected price-per-thousand impressions (eCPM) model. For example, a winner of an advertisement slot in an auction may be the advertiser with the highest eCPM bid.

BRIEF DESCRIPTION OF THE DRAWINGS

The system may be better understood with reference to the following drawings and description. Non-limiting and non-exhaustive examples are described with reference to the following drawings. The components in the drawings are not necessarily to scale, emphasis instead being placed upon illustrating the principles of the system. In the drawings, like referenced numerals designate corresponding parts throughout the different views.

FIGS. 2A, 2B and 2C include example streams of advertisement items, content items, and data items in, respectively, a new property page, a homepage and a travel page.

DETAILED DESCRIPTION

Figure 1:
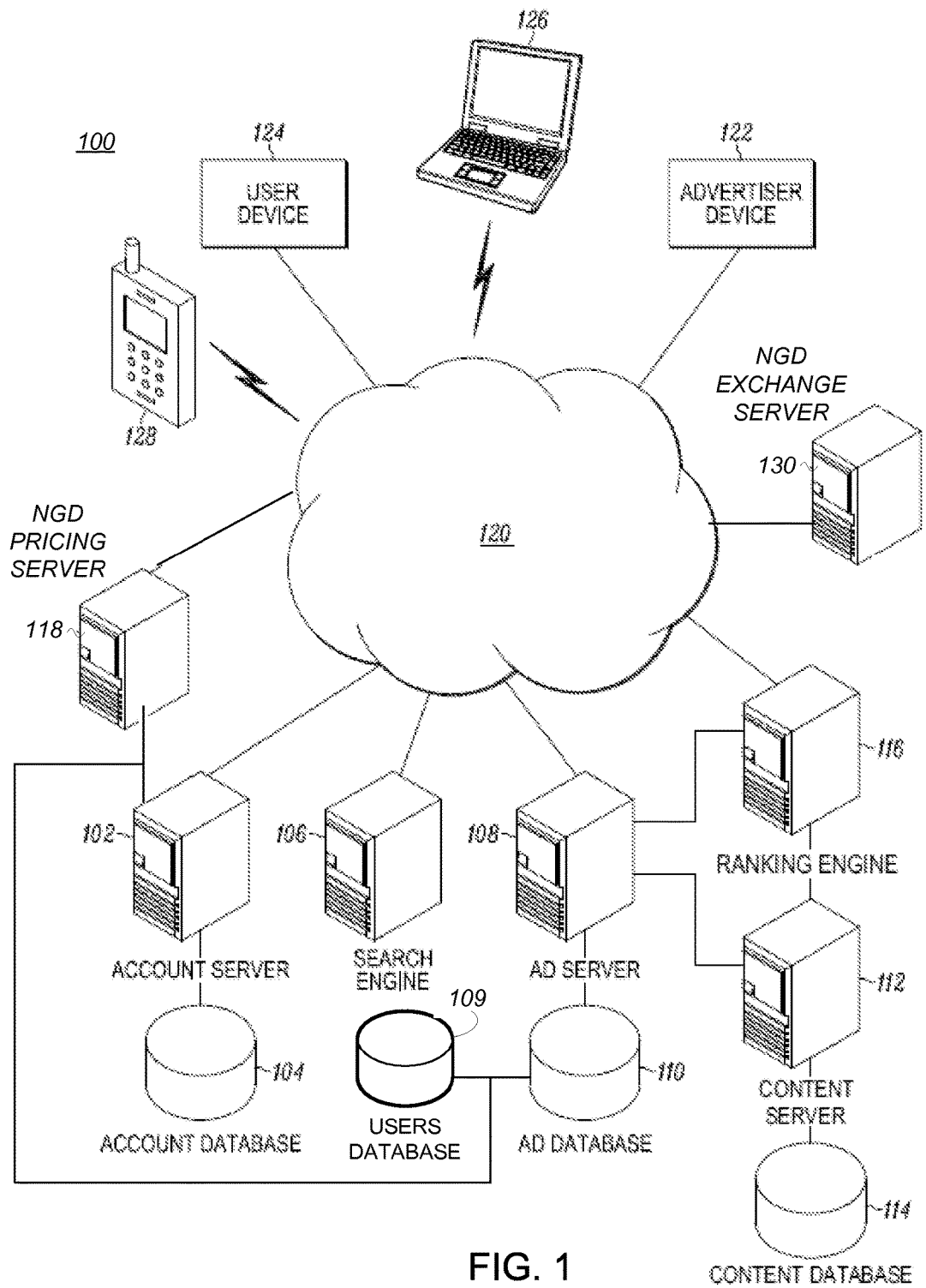
FIG. 1 is a block diagram of an example information system that includes an example non-guaranteed delivery (NGD) pricing server.

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to any examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

A system and methods for adjusting pricing for advertisements of non-guaranteed delivery ("NDG") advertising auctions in different display and online advertisement campaign contexts includes retrieving dwell time information for users that engage advertisements streamed to the users in a display content stream. The system aggregates the advertisements into different groups according to different display and online advertisement campaign contexts, such as much not limited to: advertising category, device on which the advertisement is viewed, and product (and/or property) in which the advertisement is streamed or additional contexts as will be apparent herein. The system may then compute short-click ratios (or bounce rates) of advertisements in each group based on a short-click threshold (of a small number of seconds) assigned to the group and the user dwell time information for the group. The system further determines a dwell time statistic such as average dwell time by users on advertisements in respective groups.

The system may then adjust pricing of the advertisements of a group for different display and online advertisement campaign contexts for NGD bidding based on the short-click ratio and the dwell time statistic of the group, such as to favor groups having higher dwell times and lower short-click ratios. The pricing may be based on expected price-per-thousand impressions (eCPM). By automated price adjustment, campaigns may have a higher chance to win auctions on web products where advertisements of the campaigns enjoy highly engaged users. At the same time, advertisements on web products (or properties) that are less engaged may have their pricing discounted as a result, to protect user experience.

By considering the impact of user engagement into advertisement pricing adjustments, the system helps publishers achieve the goal of generating healthy short-term revenue and driving long-term user engagement. The automatic adjusting of the bidding price for the same advertising campaign on a stream of display advertisements may be applied to different products (and/or properties) based on the different dwell time distributions of the campaign on different user devices. Accordingly, the system may enable advertisers to specify only one bidding price for one campaign on one major product (or property) where the advertisements are displayed (e.g., homerun stream), and the bidding price may be automatically (or dynamically) adjusted on other products based on user engagement (experience) with the advertisements on the web page.

An online information system places advertisements of advertisers within content services made available to end users, such as web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser. The advertiser conventionally defines an advertising campaign to control how and when advertisements are made available to users and to specify the content of those advertisements.

Streams are becoming common in online presentation because they provide flexibility for content providers who source content items for the stream, advertisers who source advertising items for the stream and for the online provider who combines the content items and the advertising items to produce the stream. A stream allows any number and size and shape of content items and advertising items to be included in the stream. The elements of the stream may be sorted by relevance or by any suitable parameter. A stream also lowers the cognitive load on the viewer when processing when processing information associated with different items of content or advertisements by removing the cognitive overhead associated with switching to a different visual format or perspective.

The stream may be viewed as a unified marketplace where content items and advertising items compete for placement or inclusion in the stream. The participants in the marketplace are advertisers who sponsor or provide the advertising items and content providers who sponsor or provide the content items. The stream and the marketplace may be hosted or managed by an online provider such as Yahoo! Inc. The online provider may also provide advertisements for its own products and services or its own content items for the stream.

Advertisers interact with equipment of the online provider to create or provide online advertisements. The online advertisements include advertising content stored in a database or other memory in association with identification of the advertiser and one or more bid amounts. The advertising content may include text or graphics or both and a link to a landing page to which the user's browser is redirected upon clicking the link. The bid amount represents an amount of money the advertiser will pay upon an event pertaining to the advertisement. The event may be an impression or viewing of the advertisement by a user, a click through or other selection of the advertisement by the user viewing the advertisement, or an action following viewing the advertisement such as providing credit card information or an email address. The bid amount may be used for determining position of the advertisement in the stream in a manner to be described below. The online advertisement may include other data as well including data defining how the advertisement will appear in the stream.

The content items include information on a topic that may be of interest to a user. This information may include a link to another web page providing more information about the topic and a summary of information about the topic. In some embodiments, a content provider will associate a bid amount with a content item. Similar to bid amounts for advertisements, the bid amount for a content item may be based on an impression, a click through, or another action. Also, the bid amount may be used for determining position of the content item in the stream in a manner to be described below. Alternatively, a software based bidding agent may be employed to automatically bid on behalf of content items.

The content items and advertisement items are in competition for inclusion in the stream. The competition for slots in the stream may be cleared using a Generalized Second Price (GSP) auction mechanism. In a GSP auction, the highest bidder gets the first slot, the second highest bidder gets the second slot and so. However, the highest bidder then pays the price bid by the second highest bidder. This is similar to a sponsored search marketplace although the bids in sponsored search are expressed differently and the competition in a sponsored search marketplace is only between advertisements.

In one embodiment, an advertiser provides targeting predicates, an advertisement snippet and a bid. In some embodiments, the advertiser can provide a budget across multiple triples, referred to as targeting triples. Targeting predicates may be based on any type of market segment of interest to advertisers, including in one example, demographic markets, market segments based gender or age, behavioral segments based on user profile information, or geographic markets. The bids may be cost per click (CPC) bids, cost per impression (CPM) bids or cost per action (CPA) bids. The online provider may choose not to support all bid types in all marketplaces.

What advertisers are allowed to bid for in large part determines their bidding behavior. For the online provider who manages the unified marketplace, there is a trade-off between allowing advertisers to bid for very specific targets versus allowing advertisers to bid for more broad targets.

The online provider may prefer markets that are thick with many competing advertisers to thin markets with few advertisers. The thicker the market, the greater the potential for increased revenue to the online provider. However, many advertisers are very interested in specific types of user. These narrow-focused users will likely stay out of the marketplace unless they are allowed to bid more narrowly. Broad targets lower the average value an advertiser derives since their advertisements may be shown to users who may not be interested in their products. Lower expected values lead to lower bids.

Some of these trade-offs can be mitigated by pricing for performance, by using excellent scoring algorithms and by preventing advertisements of low relevance from showing in the stream. Pricing for performance implies charging only when a user responds to an advertisement. Advertisers would prefer to pay only when users convert, such as by paying for a product or service. However, defining and tracking conversions and estimating conversions rates may be difficult to do reliably, so marketplace operators prefer charging by clicks, which are more easily tracked and estimated. Charging per click can pose challenges. For example, not all clicks from users convert into sales for an advertiser. With too many clicks that do not result in a conversion, a low quality score for the advertisement may result.

Broad targeting requires precise scoring methods to maintain good user and advertiser experiences. Scoring is the process of assigning a value to an advertisement or content item which value can then be used for determining which item should be included in the stream. This precise scoring may require that the online provider examine not just the advertisement snippet but also the contents of the landing page. In some embodiments, an advertisement may include additional information such as metadata that is automatically collected or manually provided by the advertiser and used as signals to the scoring function.

Broad targeting may also add a difficulty in pricing for CPC advertisements. In pricing the advertisement, it is important to distinguish between the quality of the match between a keyword and a search term and the quality of the advertisement. The online operator may choose to discount advertisers for poor quality matches, which are the responsibility of the operator of the online marketplace that does the matching. The online operator may choose to charge a premium for poor quality advertisements, which are the responsibility of the advertiser.

An exemplary system will now be described in which aspects of the unified marketplace for advertisement items and content items may be illustrated and described. Further details and optional embodiments will be provided in connection with the drawings.

FIG. 1 is a block diagram of an online information system 100. The online information system 100 in the exemplary embodiment of FIG. 1 includes an account server 102, and account database 104, a search engine 106, an advertisement (ad) server 108, a users database 109, an ad database 110, a content database 114, a content server 112, a ranking engine 116, a non-guaranteed delivery (NGD) pricing server 118, and an NGD exchange server 130. The online information system 100 may be accessible over a network 120 by one or more advertiser devices such as advertiser device 122 and by one or more user devices such as user device 124. For this reason the online information system 100 may also be referred to as a NGD network system 100.

In various examples of such an online information system, users may search for and obtain content from sources over the network 120 or from the content database 114. Advertisers may provide advertisements for placement on web pages and other communications sent over the network to user devices such as the user device 124. The online information system in one example is deployed and operated by an online provider such as Yahoo! Inc.

The account server 102 stores account information for advertisers. The account server 102 is in data communication with the account database 104. Account information may include one or more database records associated with each respective advertiser. Any suitable information may be stored, maintained, updated and read from the account database 104 by the account management server 102. Examples include advertiser identification information, advertiser security information such as passwords and other security credentials, and account balance information.

The account server 102 may be implemented using any suitable device. The account management server 102 may be implemented as a single server, a plurality of servers, or any other type of computing device known in the art. Preferably, access to the account server 102 is accomplished through a firewall, not shown, which protects the account management programs and the account information from external tampering. Additional security may be provided via enhancements to the standard communications protocols such as Secure HTTP or the Secure Sockets Layer.

The account server 102 may provide an advertiser front end to simplify the process of accessing the account information of an advertiser. The advertiser front end may be a program, application or software routine that forms a user interface. In one particular embodiment, the advertiser front end is accessible as a web site with one or more web pages that an accessing advertiser may view on an advertiser device such as advertiser device 122. The advertiser may view and edit account data and advertisement data using the advertiser front end. After editing the advertising data, the account data may then be saved to the account database 104.

The search engine 106 may be a computer system, one or more servers, or any other computing device known in the art. Alternatively, the search engine 106 may be a computer program, instructions, or software code stored on a computer-readable storage medium that runs on a processor of a single server, a plurality of servers, or any other type of computing device known in the art. The search engine 106 may be accessed, for example, by user devices such as the user device 124 operated by a user over the network 120. The user device 124 communicates a user query to the search engine 106. The search engine 106 locates matching information using any suitable protocol or algorithm and returns information to the user device 124. The search engine 106 may be designed to help users find information located on the Internet or an intranet. In a particular example, the search engine 106 may also provide to the user device 124 over the network 120 a web page with content including search results, information matching the context of a user inquiry, links to other network destinations or information and files of information of interest to a user operating the user device 124, as well as a stream of content items and advertisement items selected for display to the user.

The search engine 106 may enable a device, such as the user device 124 or any other client device, to search for files of interest using a search query. Typically, the search engine 106 may be accessed by a client device via one or more servers or directly over the network 120. The search engine 106 may, for example, in one illustrative embodiment, comprise a crawler component, an indexer component, an index storage component, a search component, a ranking component, a cache, a profile storage component, a logon component, a profile builder, and one or more application program interfaces (APIs). The search engine 106 may be deployed in a distributed manner, such as via a set of distributed servers, for example. Components may be duplicated within a network, such as for redundancy or better access.

The ad server 108 operates to serve advertisements to user devices such as the user device 124. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the Internet, other locations on an intranet operated by the advertiser, or any access.

For online information providers, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior. This sort of information, including click data related to user behavior with respect to the advertisements may be stored in the users database 109, which may be combined with the advertisements database 110 in one embodiment.

Another approach includes profile-type advertisement targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

Yet another approach includes targeting based on content of a web page requested by a user. Advertisements may be placed on a web page or in association with other content that is related to the subject of the advertisements. The relationship between the content and the advertisement may be determined in any suitable manner. The overall theme of a particular web page may be ascertained, for example, by analyzing the content presented therein. Moreover, techniques have been developed for displaying advertisements geared to the particular section of the article currently being viewed by the user. Accordingly, an advertisement may be selected by matching keywords/and or phrases within the advertisement and the web page. One exemplary system and method are disclosed in U.S. patent application Ser. No. 13/836,052, filed Mar. 15, 2013, pending, entitled Efficient Matching of User Profiles with Audience Segments for Audience Buy. This application is incorporated herein in its entirety by this reference.

The ad server 108 includes logic and data operative to format the advertisement data for communication to the user device. The ad server 108 is in data communication with the ad database 110. The ad database 110 stores information including data defining advertisements to be served to user devices. This advertisement data may be stored in the ad database 110 by another data processing device or by an advertiser. The advertising data may include data defining advertisement creatives and bid amounts for respective advertisements.

For example, the advertising data may be formatted to an advertising item, which may be included in a stream of content items and advertising items provided to a user device. The formatted advertising items are specified by appearance, size, shape, text formatting, graphics formatting and included information, which may all be standardized to provide a consistent look for all advertising items in the stream. At least some advertising items may have an associated bid amount and may be considered to be revenue-generating items. The ad server 108 then provides the advertising items to other network devices such as the ranking engine 116.

Further, the ad server 108 is in data communication with the network 120. The ad server 108 communicates advertisement data and other information to devices over the network 120. This information may include advertisement data communicated to a user device. This information may also include advertisement data and other information communicated with an advertiser device such as the advertiser device 122. An advertiser operating an advertiser device may access the ad server 108 over the network to access information including advertisement data. This access may include developing advertisement creatives, editing advertisement data, deleting advertisement data, setting and adjusting bid amounts and other activities.

The ad server 108 may provide an advertiser front end to simplify the process of accessing the advertising data of an advertiser. The advertiser front end may be a program, application or software routine that forms a user interface. In one particular embodiment, the advertiser front end is accessible as a web site with one or more web pages that an accessing advertiser may view on the advertiser device. The advertiser may view and edit advertising data using the advertiser front end. After editing the advertising data, the advertising data may then be saved to the ad database 110 for subsequent communication in advertisements to a user device.

The advertisement server 108 may be a computer system, one or more servers, or any other computing device known in the art. Alternatively, the advertisement server 108 may be a computer program, instructions and/or software code stored on a computer-readable storage medium that runs on a processor of a single server, a plurality of servers, or any other type of computing device known in the art.

The content server 112 is in data communication with the content database 114, the ad server 108 and the ranking engine 116. The content server 112 may access information about content items from either the content database 114 or from another location accessible over the network 120. The content server 112 communicates data defining content items and other information to devices over the network 120. This information may include content data communicated to a user device. This information may also include content data and other information communicated with a content provider operating a content provider device. A content provider operating a content provider device may access the content server 112 over the network 120 to access information including content data. This access may include developing content items, editing content items, deleting content items, setting and adjusting bid amounts and other activities.

The content server 112 may provide a content provider front end to simplify the process of accessing the content data of a content provider. The content provider front end may be a program, application or software routine that forms a user interface. In one particular embodiment, the content provider front end is accessible as a web site with one or more web pages that an accessing content provider may view on the content provider device. The content provider may view and edit content data using the content provider front end. After editing the content data, the content data may then be saved to the content database 114 for subsequent communication to a user device.

The content server 112 includes logic and data operative to format content data and other information for communication to the user device. For example, the content data may be formatted to a content item that may be included in a stream of content items and advertisement items provided to a user device. The formatted content items are specified by appearance, size, shape, text formatting, graphics formatting and included information, which may all be standardized to provide a consistent look for all content items in the stream. In some embodiments, the content items have an associated bid amount that may be used for ranking or positioning the content items in a stream of items presented to a user device. In other embodiments, the content items do not include a bid amount or the bid amount is not used for ranking the content items. Such content items may be considered to be non-revenue generating items. The content server 112 then provides the content items to other network devices such as the advertising server 108 and the ranking engine 116.

The ranking engine 116 is in data communication with the ad server 108, the ad database 110, the content server 112 and the content database 114. The ranking engine 116 is configured to identify items to be included in a stream of content items and advertising items to be provided to a user device such as the user device 124. The ranking engine 116 may thus be configured to determine which advertising items and which content items are qualified to be included in the stream and to score and to order respective advertising items and respective content items in the stream.

In one embodiment, the ranking engine 116 is configured to calculate a ranking score for each of a plurality of advertising items using bid values retrieved from the ad database 110. The ranking engine 116 is further configured to calculate a ranking score for each of a plurality of content items using bid values obtained from the content database 114. The ranking engine 116 may use other information available from the ad server 108, the ad database 110, the content server 112 and the content database 114 as well as the account database 104 when determining the ranking scores.

The account server 102, the search engine 106, the ad server 108, the content server 112, the ranking engine 116, the NGD pricing server 118 and NGD exchange server 130 may be implemented as any suitable computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The account server 102, the search engine 106, the ad server 108, the content server 112, the ranking engine 116, the NGD pricing server 118 and the NGD exchange server 130 may be implemented as online server systems or may be in communication with online server systems. An online server system may include a device that includes a configuration to provide content via a network to another device including in response to received requests for page views. An online server system may, for example, host a site, such as a social networking site, examples of which may include, without limitation, Flicker, Twitter, Facebook, LinkedIn, or a personal user site (such as a blog, vlog, online dating site, etc.). An online server system may also host a variety of other sites, including, but not limited to business sites, educational sites, dictionary sites, encyclopedia sites, wikis, financial sites, government sites, etc.

An online server system may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may not be under common ownership or control with the ad server 108, the content server 112 or the ranking engine 118.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network such as the network 120. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The advertiser device 122 includes any data processing device that may access the online information system 100 over the network 120. The advertiser device 122 is operative to interact over the network 120 with the account server 102, the search engine 106, the ad server 108, the ranking engine 116, content servers and other data processing systems. The advertiser device 122 may, for example, implement a web browser for viewing web pages and submitting user requests. The advertiser device 122 may communicate data to the online information system 100, including data defining web pages and other information. The advertiser device 122 may receive communications from the online information system 100, including data defining web pages and advertising creatives.

In some embodiments, content providers may access the online information system 100 with content provider devices that are generally analogous to the advertiser devices in structure and function. The content provider devices provide access to content data in the content database 114, for example.

The user device 124 includes any data processing device that may access the online information system 100 over the network 120. The user device 124 is operative to interact over the network 120 with the search engine 106. The user device 124 may, for example, implement a web browser for viewing web pages and submitting user requests. A user operating the user device 124 may enter a search request and communicate the search request to the online information system 100. The search request is processed by the search engine and search results are returned to the user device 124. In other examples, a user of the user device 124 may request data such as a page of information from the online information processing system 100. The data instead may be provided in another environment such as a native mobile application, TV application, or an audio application. The online information processing system 100 may provide the data or re-direct the browser to another web site. In addition, the ad server may select advertisements from the ad database 110 and include data defining the advertisements in the provided data to the user device 124.

The advertiser device 122 and the user device 124 operate as a client device when accessing information on the online information system 100. A client device such as the advertiser device 122 and the user device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, both laptop computer 126 and smartphone 128 may be operated as either an advertiser device or a user device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. A client device such as the advertiser device 122 and the user device 124 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. The foregoing is provided to illustrate that claimed subject matter is intended to include a wide range of possible features or capabilities.

The NGD exchange server 130 may be configured to conduct real-time auctions with advertisements being submitted by advertisers as advertising display opportunities become available to insert advertisements into slots (or locations) of a content stream, as will be discussed below. The NGD exchange server 130 may deliver the advertisements provided by advertisers having the highest bids to the content stream, and potentially with additional consideration of other factors, such as relevancy, taking into account the context of the advertisements adjacent or near to content that is related to the advertisements.

The NGD pricing server 118 may obtain data from the advertisements database 110 (such as targeting predicates and other criteria) and from the users database 109 such as click data (user engagement activity on identified advertisements) and devices 124, 126 and 128 from which the users are engaging identified advertisements. The NGD pricing server 118 may perform additional analysis such as determining short-click ratios and dwell time information for the advertisements with reference to users based on the obtained data, and then adjust the bid price for certain advertisements, causing more engaging advertisements to win the auction and to possibly be delivered to a different location or slot than the advertisements would be otherwise. This adjustment may provide a better user experience and generate more revenue for both publishers and advertisers, as will be discussed in more detail.

Figure 2A:
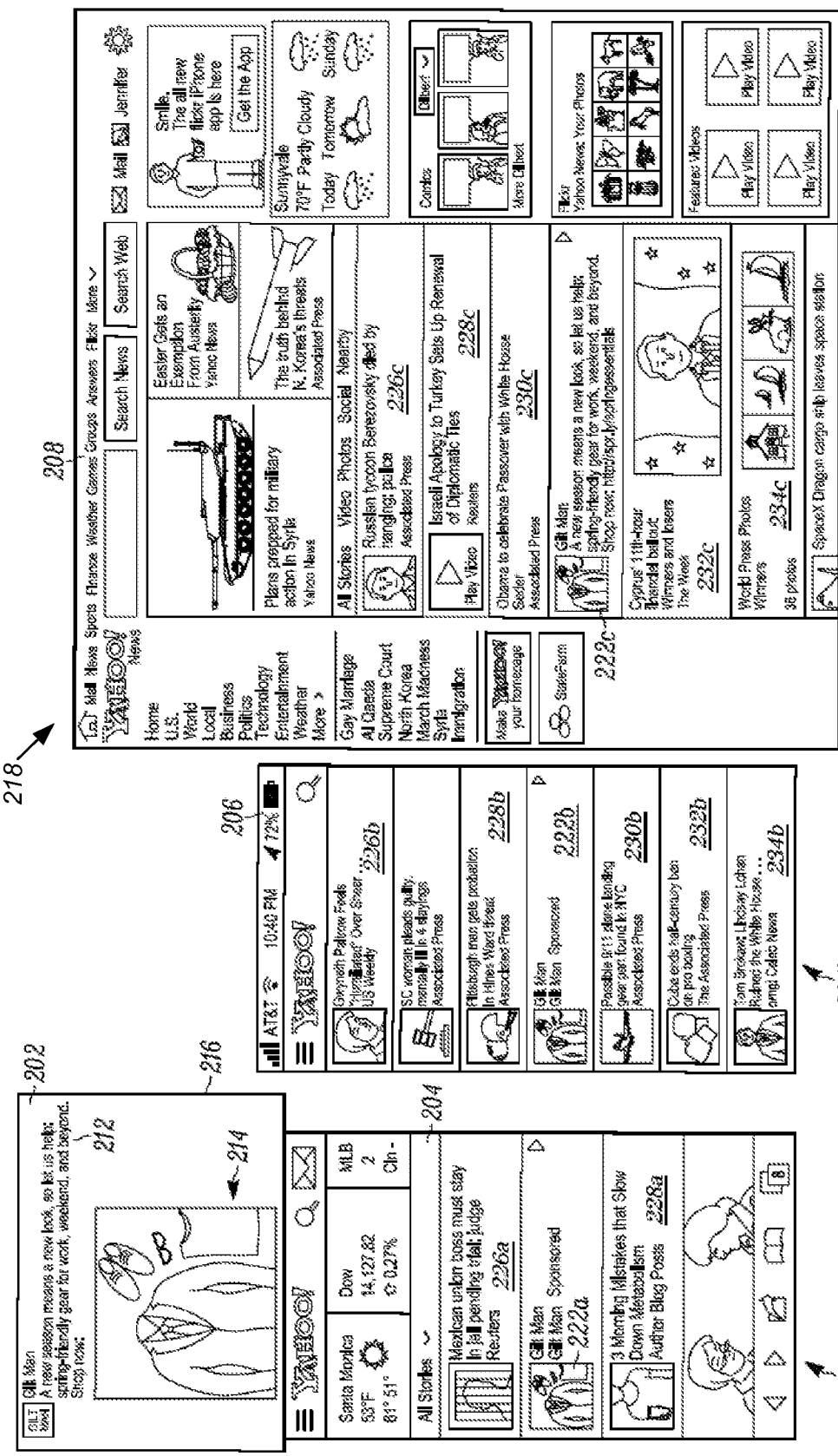

FIG. 2A illustrates streams of content items and data items displayed on selected user devices. In FIG. 2A, a display advertisement 202 is illustrated as displayed on a variety of displays including a mobile web device display 204, a mobile application display 206 and a personal computer display 208. The mobile web device display 204 may be shown on the display screen of a mobile handheld device such as a smartphone. The mobile application display 206 may be shown on the display screen of a portable device such as a tablet computer. The personal computer display 208 may be displayed on the display screen of a personal computer (PC).

The display ad 202 is shown in FIG. 2A formatted for display on a user device but not as part of a stream to illustrate an example of the contents of such a display ad. The display ad 202 includes text 212, graphic images 214 and a defined boundary 216. The display ad 202 is developed by an advertiser for placement on a web page sent to a user device operated by a user. The display ad 202 may be placed in a wide variety of locations on the web page. However, the defined boundary 216 and the shape of the display advertisement must be matched to a space available on a web page. If the space available has the wrong shape or size, the display ad 202 may not be useable.

To overcome these requirements and limitations, the display ad 202 may be reformatted or alternately formatted for inclusion in a stream of content items and advertising items including a stream advertisement incorporating contents of the display ad 202.

In these examples, the display advertisement is shown as a part of streams 224a, 224b, and 224c. The streams 224a, 224b, 224c include a sequence of items displayed, one item after another, for example, down a web page viewed on the mobile web device display 204, the mobile application display 206 and the personal computer display 208. The streams 224a, 224b, 224c may include any type of items. In the illustrated example, the streams 224a, 224b, 224c includes content items and advertising items. For example, stream 224a includes content items 226a and 228a along with advertising item 222a; stream 224b includes content items 226b, 228b, 230b, 232b, 234b and advertising item 222b; and stream 224c includes content items 226c, 228c, 230c, 232c and 234c and advertising item 222c. Each of the streams 224a, 224b, 224c may include any number of content items and advertising items. In one embodiment, the streams 224a, 224b, 224c may be arranged to appear to the user to be an endless sequence of items so that as a user of a user device on which one of the streams 224a, 224b, 224c is displayed scrolls the display, a seemingly endless sequence of items appears in the displayed stream.

The content items positioned in any of streams 224a, 224b, 224c may include news items, business-related items, sports-related items, etc. Further, in addition to textual or graphical content, the content items of any stream may include other data as well, such as audio and video data or applications. Each content item may include text, graphics, other data, and a link to additional information. Clicking or otherwise selecting the link re-directs the browser on the user's device to a web page referred to as a landing page that contains the additional information.

Stream advertisements like the advertising items 222a, 222b, and 222c may be inserted into the stream of content, supplementing the sequence of related items, providing a more seamless experience for end users. Similar to content items, the advertising items may include textual or graphical content as well as other data such as audio and video data or applications. Each advertising item 222a, 222b, and 222c may include text, graphics, other data, and a link to additional information. Clicking or otherwise selecting the link re-directs the browser on the user's device to a web page referred to as a landing page.

While the exemplary streams 224a, 224b, 224c are shown with a single visible advertising item 222a, 222b, 222c, respectively, any number of advertising items may be included in a stream of items. Conventionally, it has been known to position the advertising items at fixed locations. For example, in one conventional system, it was known to position an advertising item at the third item in the stream, counting from the top, at the sixteenth item in the stream and at every thirteenth item in the stream thereafter. That is, in the conventional system, advertisements are located in predefined slots in the stream. Slotting of the advertisements is the same for all users under all conditions. In this regard, advertisements and content items are complements in the stream. If a content item is not placed at a designated slot in the stream, an advertisement is placed in that slot.

In accordance with one aspect of the illustrated embodiment, slotting of advertisements in a stream is made dynamic. Any slot in the stream is subject to competition between advertising items and content items. A score is determined for each respective item. The scores for the advertising items and the content items are made commensurate so that advertising items and content items may be ranked against each other and the ranking used to populate the stream. Techniques for ranking the advertising items and content items are discussed in further detail below.

Figure 2B:
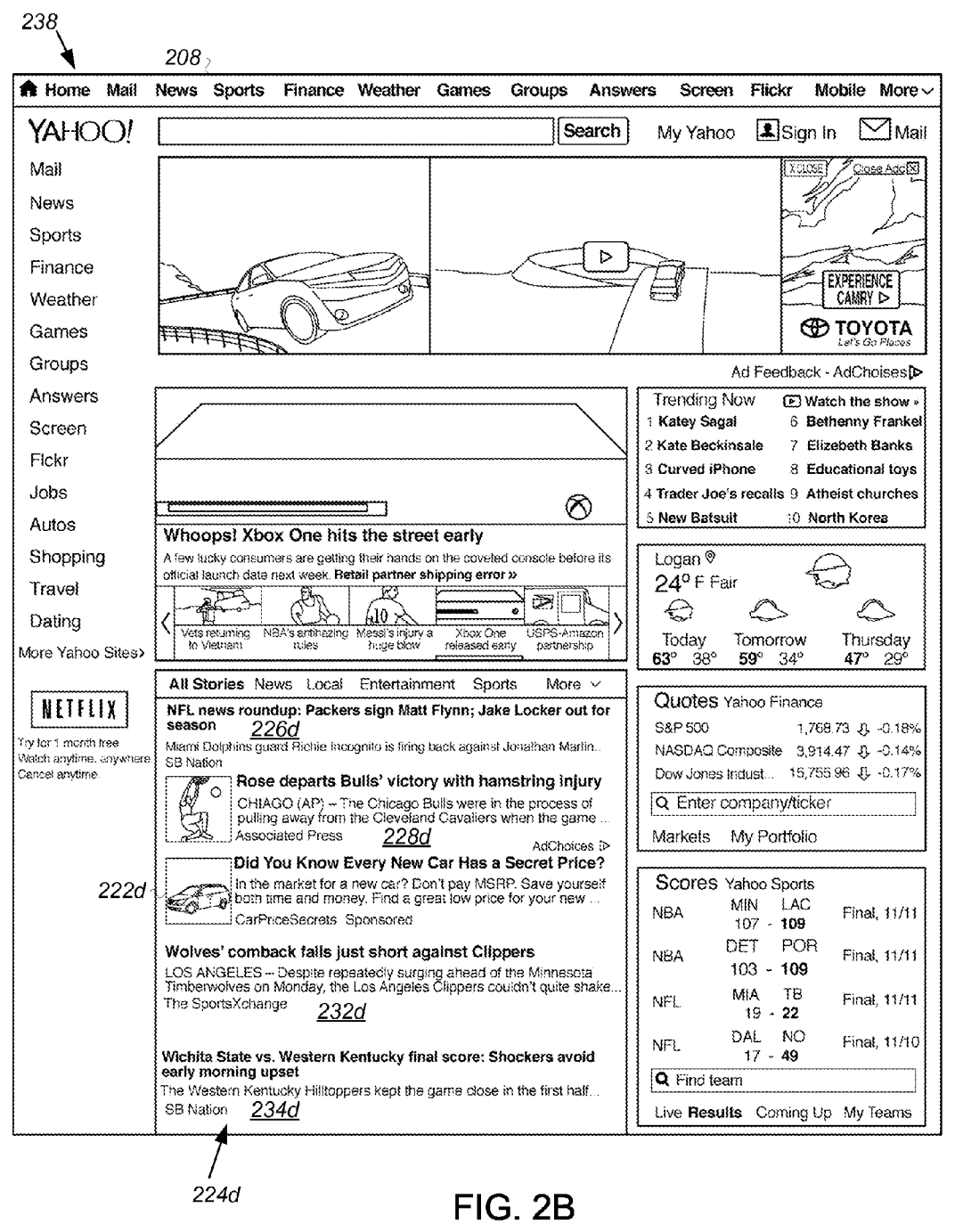
Figure 2C:
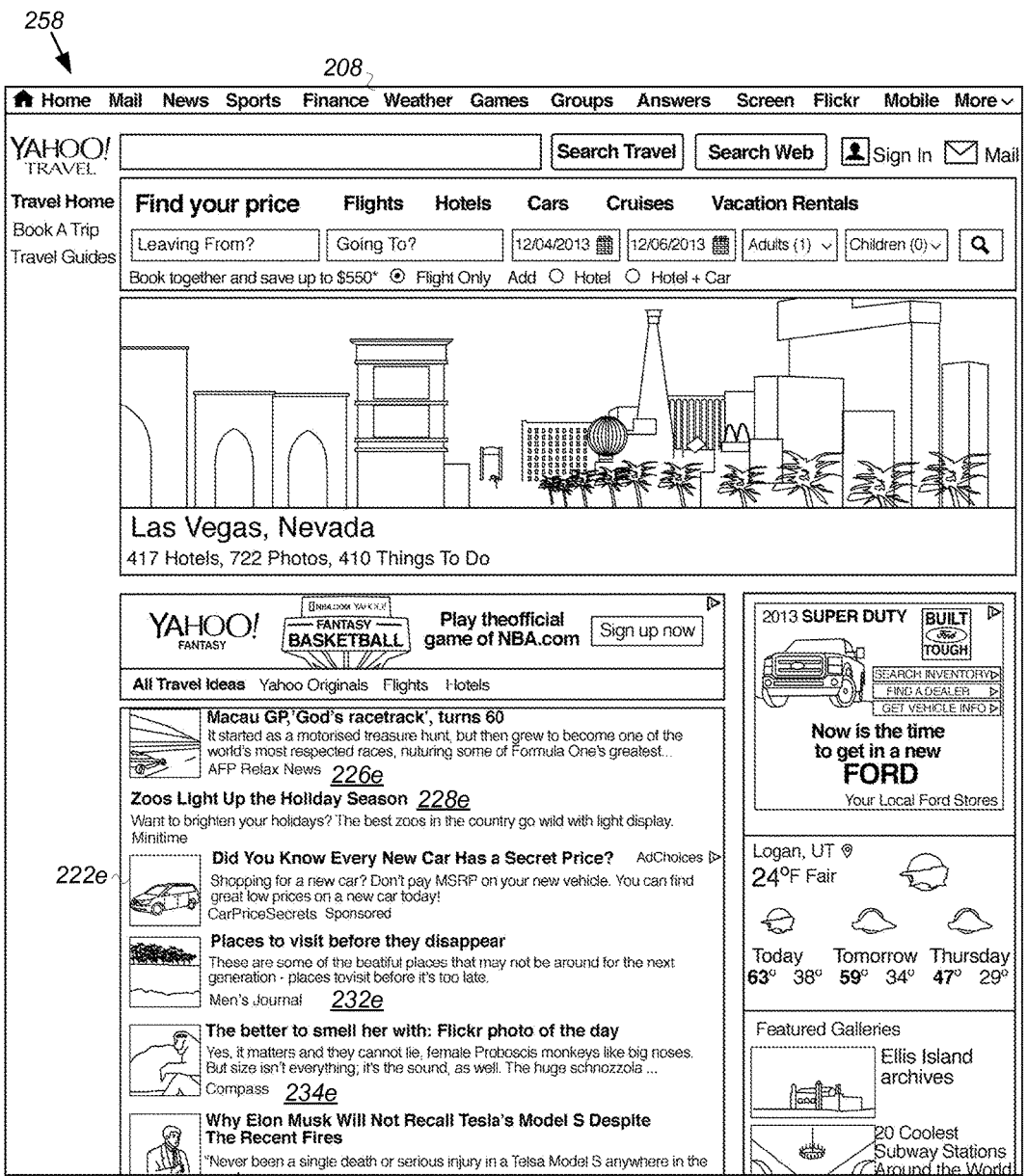

FIG. 2A is a news page 218 of Yahoo, Inc. FIG. 2B is a homepage 238 of Yahoo, Inc., and FIG. 2C is a travel page 258 of Yahoo, Inc. These are also referred to as Yahoo! properties and may include different content streams 224c, 224d and 224e, respectively. The homepage 238 of FIG. 2B and the travel page of FIG. 2C may also be displayed on a variety of displays including a mobile web device display 204, a mobile application display 206 and a personal computer display 208 as is shown on the news page 218 of FIG. 2A.

The content stream 224d (FIG. 2B) may also include content items 226d, 228d, 232d and 234d interweaved with one or more advertisement item 222d. The content stream 224e (FIG. 2C) may also include content items 226e, 228e, 232e and 234e interweaved with one or more advertisement item 222e. The content and advertisement items may differ across different properties in matching more closely with the themes of respective properties, with targeting users that would be interested in respective properties or for other reasons. The result is that different contexts are produced in the combination of the advertisement being displayed, the device on which the advertisement is displayed, and the product or property in which the advertisement is streamed within a content stream. User engagement information may be gathered with reference to the content and advertisement items across these different display contexts.

With further reference to FIG. 1, the NGD pricing server 118 may price one or more NGD content items, such as NGD advertisements, at an optimal price according to user interactions with the item(s) or content associated and/or linked with the item(s). Such user interactions, including dwell times, clicks, sharing of content, likes, and tweets, for example, can define user engagement with the item(s). Hereinafter, user engagement with the item(s) will be referred to as "user engagement."

The NGD pricing server 118 may be part of an NGD exchange server 130 or may be a distributed computing system within a NGD network system 100. The user engagement may be associated with Internet browsing session information, such as information on dwell time and clicks of online content items, which may include but not be limited to informational and commercial advertisements ("advertisements") items. The NGD pricing can employ various techniques, including the technologies described herein. Also, other types of marketing optimizers may use the technologies and techniques described herein. For example, even though the methods and technologies described herein are especially useful for NGD content pricing, such methods and technologies can be used by any type of content pricing system, including systems that price guaranteed delivery content.

The functions described herein can apply to any type of content, such as an online advertisement within a session of a webpage view or consumed while viewing of an online stream. For example, the online advertisement can be viewed within a mobile webpage or mobile content stream. A view or any other type of user engagement or interaction can be quantified through a dwell time of a page or a stream. For the purposes of this disclosure, dwell time may be the time during which a user interacts with a content item or an advertisement. For example, dwell time can be measured as the time between two interactions with content, such as two interactions with an advertisement on a webpage or within an online content stream.

In an example, the NGD pricing module may include a data-driven tool for NGD pricing. This tool may enhance a CPC based pricing model with dwell time information as input to improve revenue generated from online advertisements and other types of online content. Besides improving revenue generated by an item of content, the enhancement is meant to increase user engagement with the item.

The price-per-thousand impressions (eCPM) of CPC pricing models in an NGD market may be computed by Formula 1.

$$eCPM(CPC)=p(click|impression,content)*b, \quad (1)$$

wherein p(click|impression,content) is the probability that an impression will result in a click, and b is a bid or a selected price for an impression of a content item.

Formula 1 uses a probability that an impression will result in a click. An alternative example can use a probability that a certain dwell time will occur. Also, Formula 1 could be modified to consider other forms of user engagement or interaction with online content.

Using dwell time instead of clicks may have advantages. For example, dwell time may be a more accurate measure of actual user engagement with a content item or ad in some instances. For example, if a user is taking the time to read or view the content item, opposed to merely clicking on it, that item may be more engaging. In exemplary embodiments, dwell times and/or impressions resulting from clicks may be considered in determining eCPM.

To enhance the effectiveness of eCPM with respect to actual user engagement or interaction, dwell time may be used by the NGD pricing server 118. Dwell time may be used solely or in combination with other measurements of user interaction or engagement, and the NGD pricing server 118 may also use dwell time based user engagement to adjust an eCPM based bid for a CPC auction. Advertisements with short dwell times may be discounted, while advertisements with long dwell times may have a higher eCPM based bids. Whether a dwell time is considered long or short depends on context (such as context with respect to an associated campaign, a device displaying the ad, and the type of medium the advertisement is delivered). For a simple example, for article content items, the average dwell time may correlate to the length of the article. A long article may have higher short and long dwell time thresholds. Also, conservative fixed thresholds can be used for each context, or machine-learning techniques to learn dynamic threshold functions in different contexts can be leveraged to determine engagement thresholds.

In an example, thresholds can be determined according to a mean, medium, and/or mode of engagement, such as a mode dwell time for an advertisement campaign. The threshold can be set at a point after the mean, medium, or mode. Also, a dwell time distribution or distributions for a determined baseline advertisement or webpage can be used as a threshold as well.

Also, from using dwell time or another form of quantifying user engagement or interaction, balance between driving long term user engagement with a content item and generating revenue may be achieved by allowing more engaging advertisements to win an auction. This encourages advertisers to produce more engaging advertisements. It also benefits a publisher by providing a way to evaluate advertisements immediately from samples of user sessions with the streaming content, and determine changes to or termination of poor performing advertisements. Adding real-time functionality to the NGD pricing allows for determining such changes to or termination of advertisements sooner rather than later.

Additionally or alternatively, the eCPM of a content item (such as an ad) can be automatically adjusted by the NGD pricing module, even with a low click through rate (CTR) associated with the item and/or small samplings of session data associated with the item.

Figure 3:
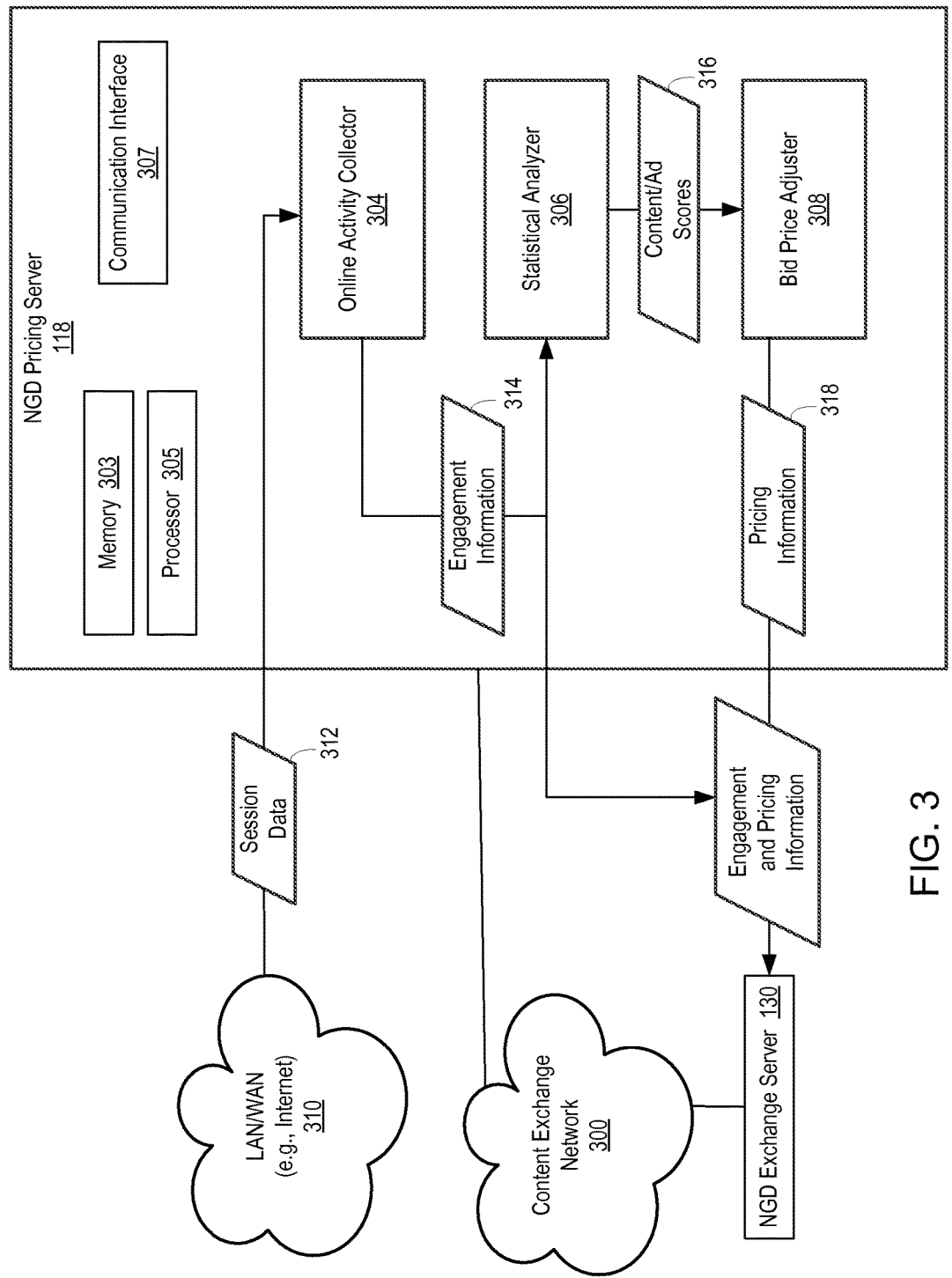
FIG. 3 is a block diagram of an example NGD pricing server, along with select data flow, that can be implemented by one or more computing systems such as displayed in FIG. 1.

FIG. 3 is a block diagram of an example NGD pricing server 118, along with select data flow. The NGD pricing server 118 may be executed within the NGD exchange server 130 or as a distributed system across two or more of the servers disclosed in FIG. 1, and as part of a content exchange network 300. The NGD pricing server 118 may include memory 303, a processor 305 and a communication interface 307 to facilitate processing and communication through the network 120. The NGD pricing server 118 may further include an online activity collector 304, a statistical analyzer 306 and a bid price adjuster 308, all of which are executable by the processor 305, and be coupled with the account server 102, the ad database 110 and the users database 109 (FIG. 1).

The processing of the NGD pricing server 118 may be integrated into and be in communication with the content exchange network 300, such as an NGD advertisement exchange, so that historical and/or real-time user engagement and interaction data (such as dwell time and click information) can be used for enhancing pricing of content, such as pricing NGD advertisements competing for slots in an auction system. The NGD pricing server 118 may leverage user engagement or interaction to manually and/or automatically adjust content pricing or valuation, such as automatically adjusting eCPM based auction prices for NGD content.

The online activity collector 304 may be communicatively coupled to a LAN/WAN 310 (such as network 120 of FIG. 1) that may include the Internet. From the LAN/WAN 310, the online activity collector 304 may receive online user session data 312, such as web browsing session data. The online activity collector 304 can then determine and communicate user interaction information 314, such as dwell time information, to the statistical analyzer 306 and the NGD exchange server 130. The statistical analyzer 306 may determine content/ad scores 316 (or just "scores" 316) according to the user interaction or engagement information 314. The scores 316 may reflect user engagement levels with respect to online content and advertisement items. From the advertisement scores 316, the bid price adjuster 308 may determine respective pricing information for the NGD advertisements. The pricing information 318 can then be communicated to the NGD exchange server 130, such as in the form of respective bids for impressions of the content in the auction system. For example, the advertisement scores 316 may be derived from eCPM, and the pricing information 318 may be derived from the content scores.

The NGD pricing server 118 may incorporate user engagement signals, such as dwell times, into eCPM computation for various types of online marketing campaigns, such as CPC campaigns in NGD markets as will be explained.

In an example, the online activity collector 304 may include a system of collecting stream advertisements per creative per click event dwell time information. In such an example, this module can collect such information via systems and methods described in "Display Time of a Web Page," filed on Mar. 15, 2013, U.S. Ser. No. 13/843,433, now U.S. Pat. No. 9,355,078, or other systems and methods, to compute per-item per-user dwell time information, for example.

Figure 4:
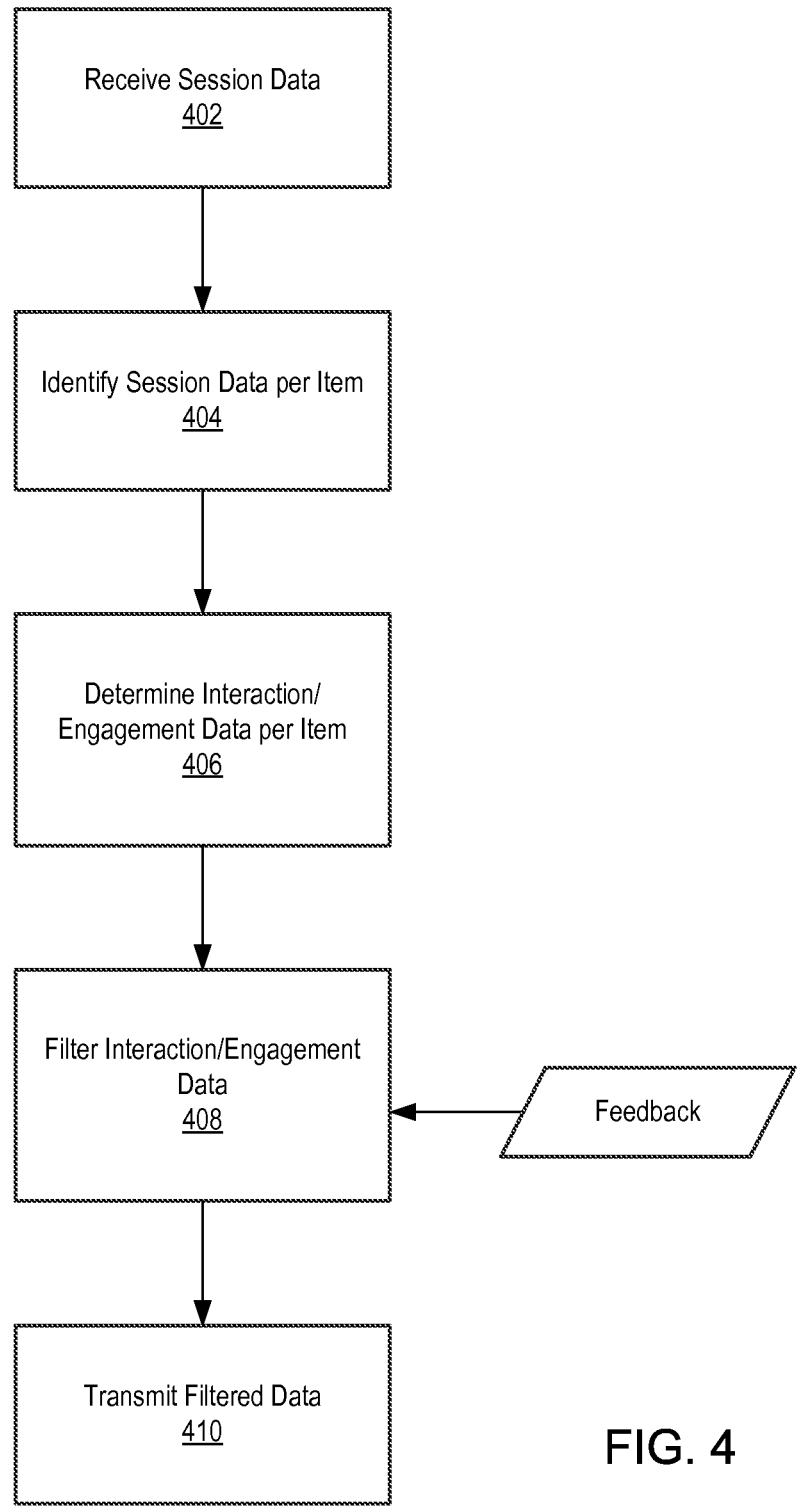
FIG. 4 are example operations performed by the data collector of the NGD pricing server of FIG. 3.

With additional reference to FIG. 4, functionality of the online activity collector 304 is described in more detail. At 402, the online activity collector 304 may receive user session data from a network, such as the LAN/WAN 310. The session data may be associated with NGD content and can include click and dwell time information, such as click and dwell time information associated with a creative. A creative may include at least one of non-advertisement content item, an advertisement item, a streamed item, a page displayed item, or any combination thereof. For example a creative can be a group of items or a single item, such as one or more of the advertisement items, contents items, and data items of FIG. 2.

At 404, the online activity collector 304 may identify session data associated with a content item broadcasted by the network according to a corresponding identifier. Session data corresponding to a content item may be associated with the content item through metadata within a tag, a header, or any other known forms of implementing metadata based data associations. Each content item may be associated with a unique identifier. At 406, the online activity collector 304 can determine user interaction information associated with the content item, such as dwell times and clicks associated with the item. The content item may be any type of online content item, including any type of advertisement and non-advertisement item.

At 408, the online activity collector 304 may filter user interaction information. The filtering of this information can be according to feedback from the statistical analyzer 306 or other aspects or modules associated with the NGD pricing module. At 410, the filtered interaction information may be transmitted to other components of the NGD pricing server 118 such as to the statistical analyzer 306.

In an example, the statistical analyzer 306 may include statistical distribution analysis aspects, which can compute dwell time and other user engagement distributions associated with the creative. Such analysis can use the raw session data collected by the online activity collector 304 or the information filtered by the online activity collector 304 (such as the data filtered at 408 and transmitted at 410).

Figure 5:
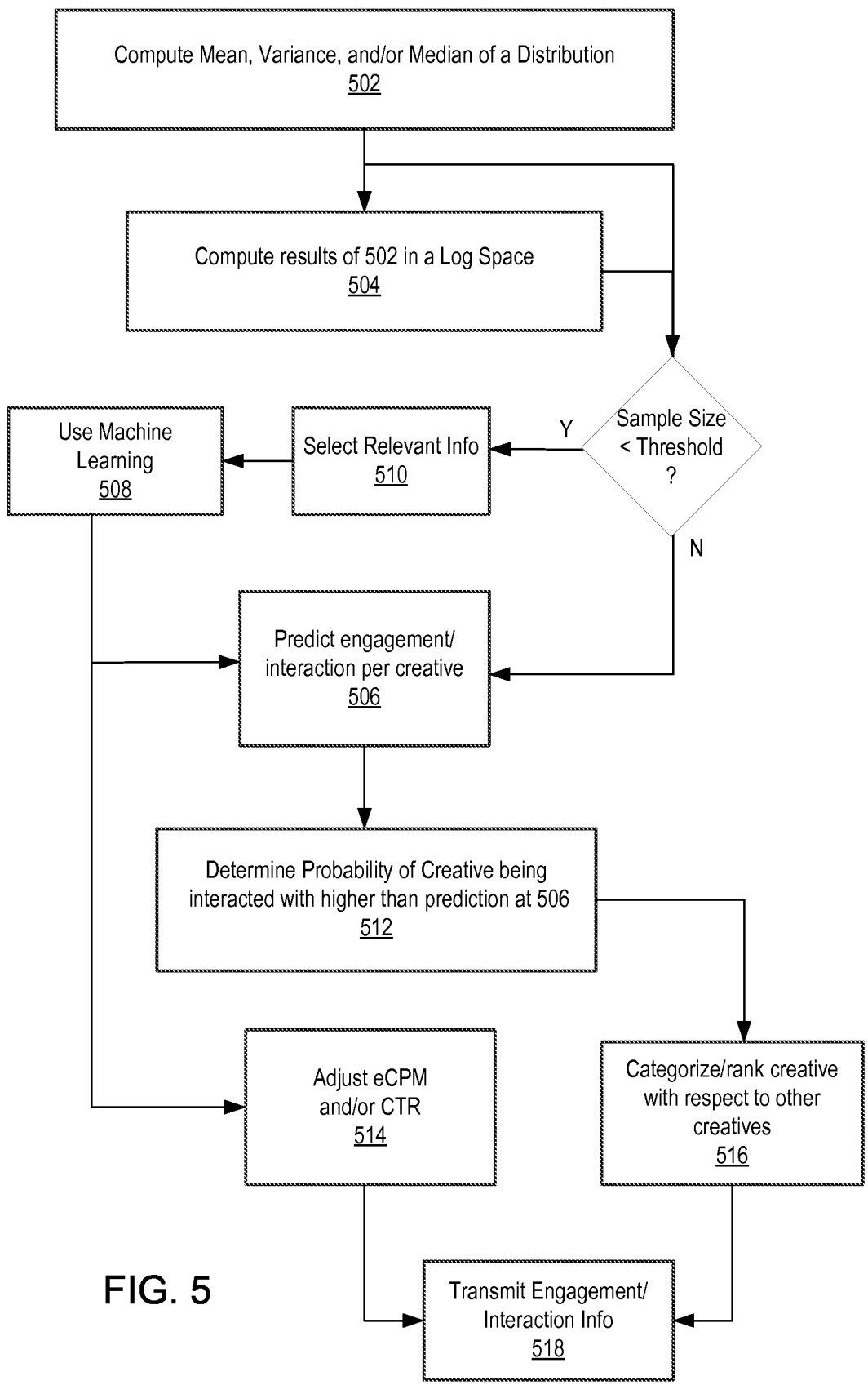
FIG. 5 are example operations performed by the statistical analyzer of the NGD pricing server of FIG. 3.

With further reference to FIG. 5, the statistical analyzer 306 is disclosed in more detail. The statistical analyzer 306 can compute a mean, a variance, and/or a median of a dwell time and/or other engagement distribution for the creative using raw session data or preprocessed data focused on identifying user interaction information, at 502. Additionally or alternatively, the statistical analyzer 306 may compute a mean, variance, and median of the dwell time and/or other engagement distribution of the creative in a log space (such as LOG(dwell time)), at 504. This may facilitate each user engagement signal, such as an advertisement click or dwell time, being associated with measurable non-binary signals, such as graded labels or dwell time based scores. For example, user engagement levels can be divided into multiple grades or quantiles (such as a first quantile, a second quantile, etc.) of dwell times in a log space. The statistical analyzer 306 may then determine the engagement grade or quantile for an engagement. Grades or quantiles may be increased by using the integer part of log(dwell time) as the engagement level, for example.

In another example, real-time per creative dwell time mean and/or variance in a log space can be a approximated via systems and methods disclosed in "Prioritizing items from Different Categories in a News Stream," filed on Aug. 28, 2013, U.S. Ser. No. 14/012,932, pending.

Also, the statistical analyzer 306 can predict an expected dwell time and/or other engagement associated with the creative, at 506. This is even the case where there is little to no historical click and/or dwell time information. Where there is little information, such as a sampling level that does not meet a threshold, the statistical analyzer 306 may use machine learning models trained on other relevant dwell time, other user interaction information, and/or attributes of the creative (such as ad length or ad category), at 508. The statistical analyzer 306 can also leverage advanced machine learning techniques and/or linear regression techniques to predict the expected dwell time for each new creative. Machine learning techniques may include gradient boosting decision trees and regression tools such as linear regression or logistic regressions, for example. The other historical click and/or dwell time information, or training data, can be selected from one or more similar creatives in order to improve the accuracy of the prediction at 506. Similarity between creatives may be determined through known methods, and in selection of the other relevant dwell time and/or user interaction information at 510, a threshold value may be predetermined with respect to the amount of similarity desired to filter out non-relevant information.

The statistical analyzer 306 may compute the probability of a creative being interacted with being higher than its predicted expected engagement (such as expected CTR and/or dwell time) according to Formulas 2 and 3, at 512. The probability of a creative being interacted with being higher than its predicted expected engagement can represent expected engagement for a creative relative to other similar creatives, for example.

$$z=(PEE-DTM)/DTV, \qquad (2)$$

wherein PEE is predicted expected engagement,
wherein DTM is real-time dwell time mean, and
wherein DTV is real-time dwell time variance.

$$P=1-phi(z)^1, \qquad (3)$$

wherein P is the probability of a creative being interacted with higher than its predicted expected engagement.

[1] https://en.wikipedia.org/wiki/Normal_distribution

P or some function of P, e.g., f(P) where the function is linear or non-linear, can be used as a discounting factor for adjusting the eCPM, such as in the case of using Formula 4 to determine eCPM. In this example, when there is limited engagement data for a creative (such as when an advertisement or advertisement campaign is new), the statistical analyzer 306 may use a student distribution model to determine eCPM.

$$eCPM = P*CTR*bid \qquad (4)$$
$$= P*p(click | impression, advertisements)*bid.$$

The statistical analyzer 306 (and/or the bid price adjuster 308) may also adjust the eCPM and/or the CTR of campaigns or creatives at 514, such as CPC campaigns, using the machine learning approach at 508. For example, the statistical analyzer 306 may use known machine learning techniques, such as gradient boosting decision trees to predict the eCPM and/or CTR of a creative. CTR can be computed directly from a click signal. In general, user engagement signals can be used to further weight and/or adjust the CTR and/or the eCPM, such as shown by Formula 5:

adjusted CTR or eCPM=Sum(weight of click or
other interaction)/impressions, (5)

wherein adjusted CTR or eCPM is an adjusted CTR or eCPM for a creative,
wherein weight of click or other interaction=F(user engagement level),
wherein user engagement level is a measure of user interaction and/or engagement with a creative,
wherein Sum(weight of click or other interaction) is the sum of weights associated with different types of engagement and interaction associated with a creative, and
wherein impressions is an amount of impressions of the creative.

Also, the statistical analyzer 306 may use an online learning algorithm to update the CTR prediction model according to received user engagement signals, such as signals collected by the online activity collector 304. This can be done for each creative. This model and the others can continually receive real-time feedback from the online activity collector 304 and can adjust eCPM, and/or CTR, according to such feedback. With time, the model should become more accurate due to more feedback over time. This concept of feedback also applies to the machine learning, at 508. Alternatively, the bid price adjuster 308 can adjust eCPM, and/or CTR, using the aforementioned modules.

Another function of the statistical analyzer 306 may include to differentiate between engaging and ignored creatives at 516 to, e.g., to determine relative levels of engagement of a creative with respect to competing creatives, such as providing scores for ranking creatives competing for a bid on a slot. Also, creatives with a low rank with respect to a threshold rank or competing creatives can be discounted, and creatives with a high rank with respect to a threshold rank or competing creatives can be charged a premium. The aforementioned models can be combined in various manners to provide different results, and such combining can be automated. This automation of combining models can be directed by the statistical analyzer 306, according feedback received from the online activity collector 304 and/or the bid price adjuster 308, for example.

Data associated with the adjusted eCPM and/or CTR and/or the rated creatives may then be transmitted to other components of system associated with the NGD pricing module, such as the bid price adjuster 308 for price adjustment, at 518.

The bid price adjuster 308 may include various price adjustment logic or components. Additionally or alternatively, the bid price adjuster 308 may include a bidding price component, which can control user engagement signal enhanced eCPM-based bidding computations for a creative and/or groupings of creatives, such as one or more advertisements to be published by an advertisement exchange. As shown in FIG. 3, pricing information and user interaction information may be directed to one or more servers of a content exchange network 300 from a price adjustment module. For a creative or campaign, the bid price adjuster 308 may also base eCPM on respective dwell time distribution, respective predicted expected dwell times, and other factors determined by the statistical analyzer 306. Exemplary determination and adjustment of eCPM can be done using any combination of models described herein, and can be performed by the bid price adjuster 308.

Figure 6:
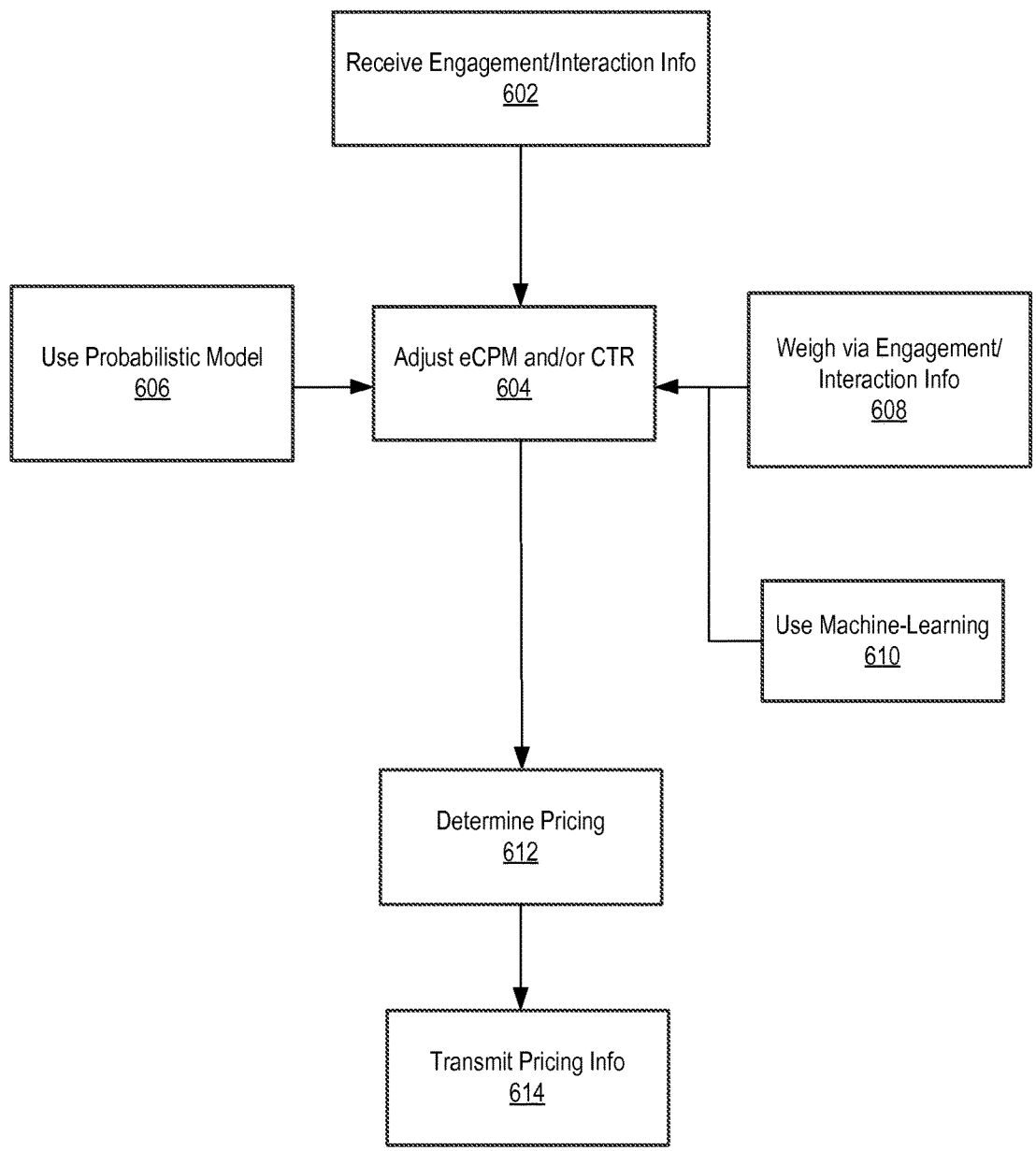
FIG. 6 are example operations performed by the price adjuster of the NGD pricing server of FIG. 3.

With further reference to FIG. 6, functionality of the bid price adjuster 308 is disclosed in more detail. At 602, the bid price adjuster 308 may receive the user interaction information, such as from the statistical analyzer 306. The bid price adjuster 308 may use the user interaction information to adjust the eCPM and/or CTR for the displayed creative, at 604. For example, adjustment by the bid price adjuster 308 may be based on a probabilistic dwell time distribution model at 606. This type of adjustment can compute an eCPM price adjustment factor correlated to the probability that a creative will have a better than average user engagement level.

The bid price adjuster 308 may also use user interaction information to weigh clicks or dwell times at 608. Using such a weight, the bid price adjuster 308 can determine an adjusted CTR (such as a discounted CTR), for example. The bid price adjuster 308 can also use machine learning techniques, such as regression approaches and online learning approaches, to determine adjusted CTR, at 610, so that the adjusted CTR can be an input for determining eCPM based pricing, such as in determining eCPM based pricing for NGD CPC contracts. At 612, the bid price adjuster 308 may determine a price and/or a bid for the creative based on the adjusted eCPM and/or CTR. At 614, the bid price adjuster 308 can transmit the pricing and/or bid information to the NGD exchange server 130 for participation in an NGD auction of the content exchange network 300.

The bid price adjuster 308 can use an adjusted eCPM of a creative as a bidding price or at least a basis for a bidding price of the creative to enter a slot, such as an advertisement slot. With this arrangement, the NGD pricing server 118 may automatically promote more engaging content and demote non-engaging content over time. Even creatives associated with a limited amount of session data can be promoted and demoted to a lesser degree. In other words, promotion and demotion of a creative or a bid price of a creative can be based partially on the amount of historical data available associated with that creative. Less engaging creatives will have a lower probability of winning a slot opportunity in an auction. Also, by adjusting price for less engaging creatives, publishers of the creative will take less risk in placing their creatives in streams and web pages.

The NGD pricing server 118 may also be useful when used with a unified market place stream and/or various social media streams. For example, the pricing module is useful with. "Prioritizing Items from Different Categories in a News Stream," filed on Aug. 28, 2013, U.S. Ser. No. 14/012,932, pending. The NGD pricing server 118 may reduce a publisher's risk of losing users long term when adjusting strategies for delivering content. The ability to adjust eCPM in a stream may be especially useful considering the high CTRs experienced in content stream environments.

Figure 7:
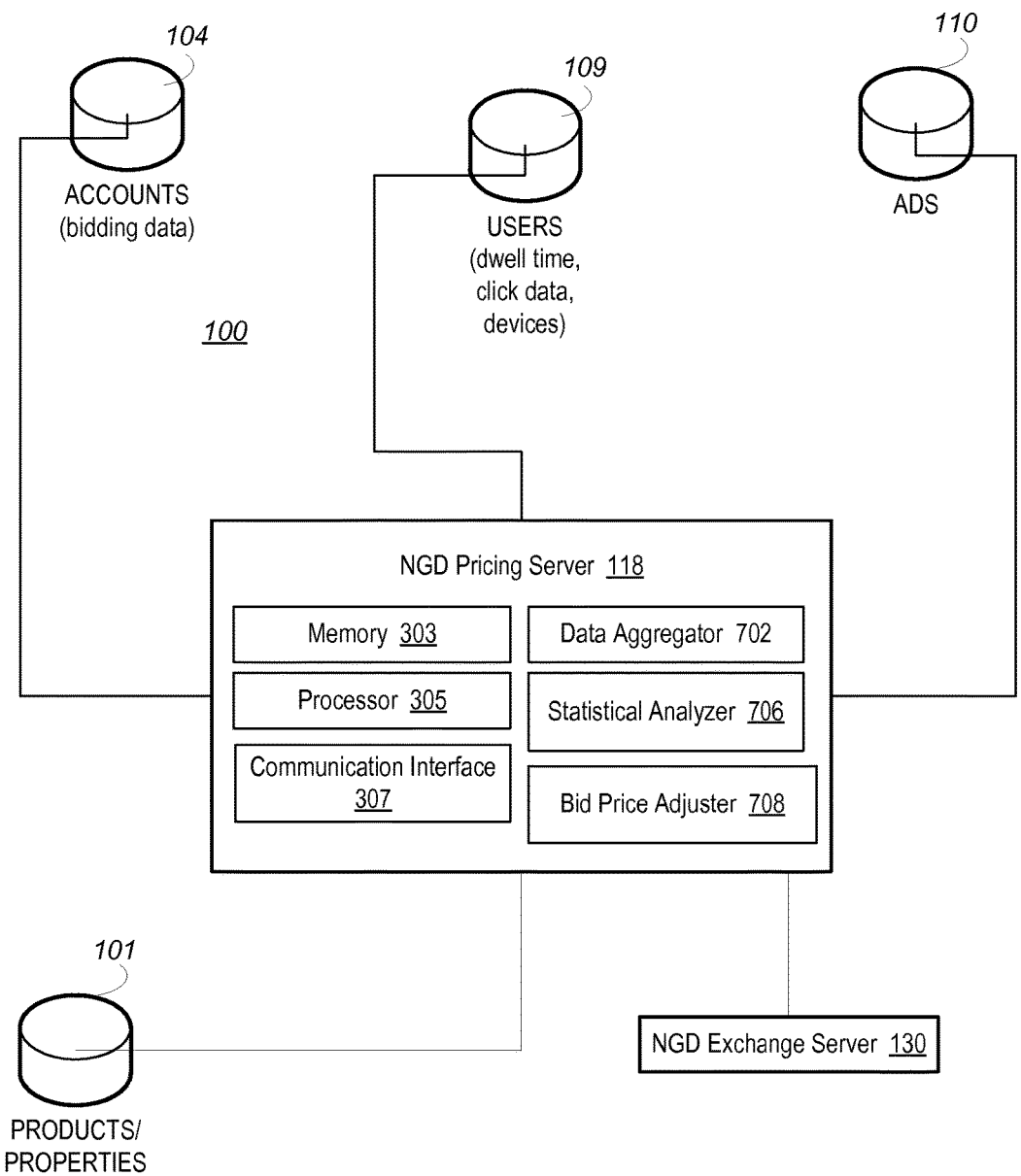
FIG. 7 is a system diagram of another embodiment of the NGD pricing server, adapted to perform adjustments to pricing of advertisements in an NGD exchange.

FIG. 7 is a system diagram of another embodiment of the NGD pricing server 118, adapted to perform adjustments to pricing of advertisements in an NGD exchange. The example of FIG. 7 expands on the example disclosed with reference to FIGS. 3-6, and additionally has access to a products and properties database 101. The bid price server 118 may include, in addition to those features discussed in FIG. 3, a data aggregator 702, along with a statistical analyzer 706 and a bid price adjuster 708, which may be executed by the processor 305 and memory 303.

Products and properties (of database 101) are either the products or web page-based content that may relate to some product or service provided by publishers. In some cases the information provided on a web page property may be information, but usually will also include advertisements. For example, a product may include some good such as a television, DVD player or game or a website related to these items. A property may include such information content and services as: e-mail, auto, news, sports, weather, finance, games, travel and the like, such as those provided by Yahoo! of Sunnyvale, Calif.

The processor 305, executing the online activity collector 304, may retrieve dwell time information, e.g., from storage in the users database 109, and may include user engagement information with relation to advertisements streamed to the users in a display content stream.

The data aggregator 702 may group display advertisements intended to be displayed within slots of a display content stream based on different displays and online advertisement campaign contexts, such as but not limited to: an advertising tier and/or category, a device on which the advertisement is viewed, and a product (or property) in which the advertisement is streamed. To do so, the data aggregator 702 may pull data from the users database 109, the advertisements database 110, and the products/properties database 101, and correlate this data in such a way that sufficiently similar advertisements in these respects are grouped together so that NGD price adjusting (which will be discussed) takes place in such a way that advertisements having a higher probability of generating higher user engagement have higher chances of wining an NGD auction.

A tier may be an advertiser and quality-based categorization of advertisements, which may be based in part on branding and reputation, whereas a category of advertisements is based on being sufficiently similar in subject matter.

By way of example, tier 1 ("one") advertisements may be those that meet more of certain quality criteria, including but not limited to: are high quality, universally recognized and in low-risk categories. These tier 1 advertisements may not require age targeting or any other type of brand or category-specific caveats and may not be associated with risks, where risks can be viewed as sexually explicit content, pharmacological projects, or alcohol to name a few examples. A tier 1 advertisement may never have had any compliance issue with streaming advertisements or any other Yahoo! advertising product, and may be a brand approved for the Y! home page. Examples of tier 1 advertisements may come from companies such as Coca Cola, Ford, Verizon and Proctor & Gamble.

By way of further example, tier 2 ("two") advertisements may also be of high quality, but less universally recognized, in a low risk category (like popular regional brands) or may be universally recognized and in a moderate risk category (like weight loss, loans, or categories that require age targeting like pharmacological or alcoholic beverages). Tier 2 advertisements may also need to have never had a compliance issue with streaming advertisements or any other Yahoo! advertising product, and is an advertiser that does not create misleading advertisements (e.g., where the advertisements appears to be for content, but he landing page is simply a brand destination) or advertisements with irrelevant images. A few example tier 2 categories of advertisements include lingerie, prescription pharmacological, weight loss, alcohol and birth control. A few example tier 2 advertisers include Pfizer, Victoria' Secret, Budweiser, Weight Watcher, and Pink's Hot Dogs.

By way of further example, tier 3 ("three") advertisements may come from classified stream advertisements eligible advertisers that do not fall into either tier 1 or tier 2 levels of categorization. Example tier 3 advertisements include low quality products or that are cheap looking. Example categories that could likely fall with tier 3 include lead generation, sexual health products, dating sites and people search sites.

By way of further example, tier 4 ("four") advertisements may applied to advertisers that are yet unclassified and are therefore largely unknown or untested. Finally, tier 5 ("five") advertisements may include those advertisements that are banned from streaming advertisements.

The processor 305 may further compute short-click ratios of advertisements in each group as determined by the data aggregator 702. A short-click ratio may be based on a short-click threshold (e.g., 4 or 6 seconds) assigned to the group and the user dwell time information for the group. A "short-click" may be a click from a user that has such a short dwell (or engagement) time on an advertisement that it falls below the short-click threshold. The short-click ratio may also be referred to as a "bounce rate," or the rate at which users quickly bounce back or away from displayed advertisements. To compute the short-click ratio, the processor may determine the percentage of time that users engage respective advertisements of the group for a time period less than the short-click threshold.

The statistical analyzer 706 may then apply a statistical function to the dwell time information of the advertisements in respective groups, to generate a dwell time statistic for each respective group. Such dwell time statistics may include an average dwell time by users on the advertisements of the group or any other algorithm or function that provides a statistical analysis of the dwell time information or of a logarithm of the dwell time of users on identified advertisements. The statistical analyzer 706 may compute the average dwell time for a group by computing a mean, a variance or a median of dwell time distribution of the advertisements of the group. Other dwell time statistics will be discussed in more detail.

The bid price adjuster 708 may then adjust pricing of the advertisements of a group for NGD bidding based on the short-click ratio and the dwell time statistic of the group, such as to favor groups having higher dwell times and lower short-click ratios. The pricing of the advertisements within the group may be expected cost-per-thousand impressions (eCPM) pricing (as discussed before), and where to adjust the eCPM pricing, the bid price adjuster 708 may discount pricing for a group of advertisements that have a lower average dwell time when compared to another group of advertisements.

For example, the bid price adjuster 708 may compute a level of discount applied as a ratio of the short-click ratio of the group of advertisements when compared to the short-click ratio of the other group of advertisements. That is, say analysis shows that the short-click ratio of certain category of advertisements on the homepage stream on Desktop is 5% while the short-click ratio of the same category of advertisements on Mail Stream on Desktop is 20%, then the processor may compute a discounting price up to 0.25 (based on 5%/20%). Accordingly, when bidding on advertisements, the bidding price may be automatically adjusted to $0.25*P, where P if the bidding price on Mail Stream.

The processor 305 may be further configured to set an eCPM pricing level for a second product for which no bidding price has been supplied by a user, but which is related to a first product for which the user has set a bidding price, based on the short-click ratio and the dwell time statistic of a group including the first and second products.

The adjustment or discount determination may be done offline and then applied online to subsequent NGD auction bidding. The processor 305 may be further configured to periodically update the dwell time information for the advertisements of the group, which may be retrieved based on recent historical user browsing activities. These periodic updates provide for dynamic, auto-adjustment that provides a feedback loop from the online user engagement results, thus providing changes in pricing that favors higher levels of user engagement. In this way, the NGD network system 100 can effectively adapt for pricing changes in the marketplace, new environments (e.g., new products and user experiences), new categories of advertisements and user experiences with those new advertisements.

By considering the impact of user engagement into advertisement pricing adjustments, the NGD network system 100 helps publishers achieve the goal of generating healthy short-term revenue and driving long-term user engagement. The automatic adjusting of the eCPM bidding price for the same advertising campaign on a stream of display advertisements may be applied to different products (and/or properties) based on the different dwell time distributions of the campaign on different user devices. Accordingly, the NGD network system 100 of FIG. 7 may enable advertisers to specify only one bidding price for one campaign on one major product (or property) where the advertisements are displayed (e.g., homerun stream), and the bidding price may be automatically adjusted on other products based on user engagement (experience) with the advertisements on the web page.

Further, the creatives from different categories of campaigns displayed on different products may lead to different levels of user engagement and also generate different user experiences. For example, users may have more interactions (or are highly engaged) with the financial or insurance advertisements on the Yahoo Finance site. Accordingly, the bid price adjuster 708 may adjust the advertisement pricing using the user engagement information so that campaigns may have a higher chance to win auctions on web products where advertisements of the campaigns enjoy highly engaged users. At the same time, advertisements on web products (or properties) that are less engaged may have their pricing discounted as a result, to protect user experience.

Furthermore, use of the average dwell time information with the short-click ratio for each advertisement campaign category (or tier) of advertisements on respective products and user devices to adjust the NGD bidding prices, ensures having enough user-generated dwell time data to obtain a fair market price for different online advertisement campaigns on different products for the advertisers, and still achieve a good user experience in varying contexts.

Figure 8:
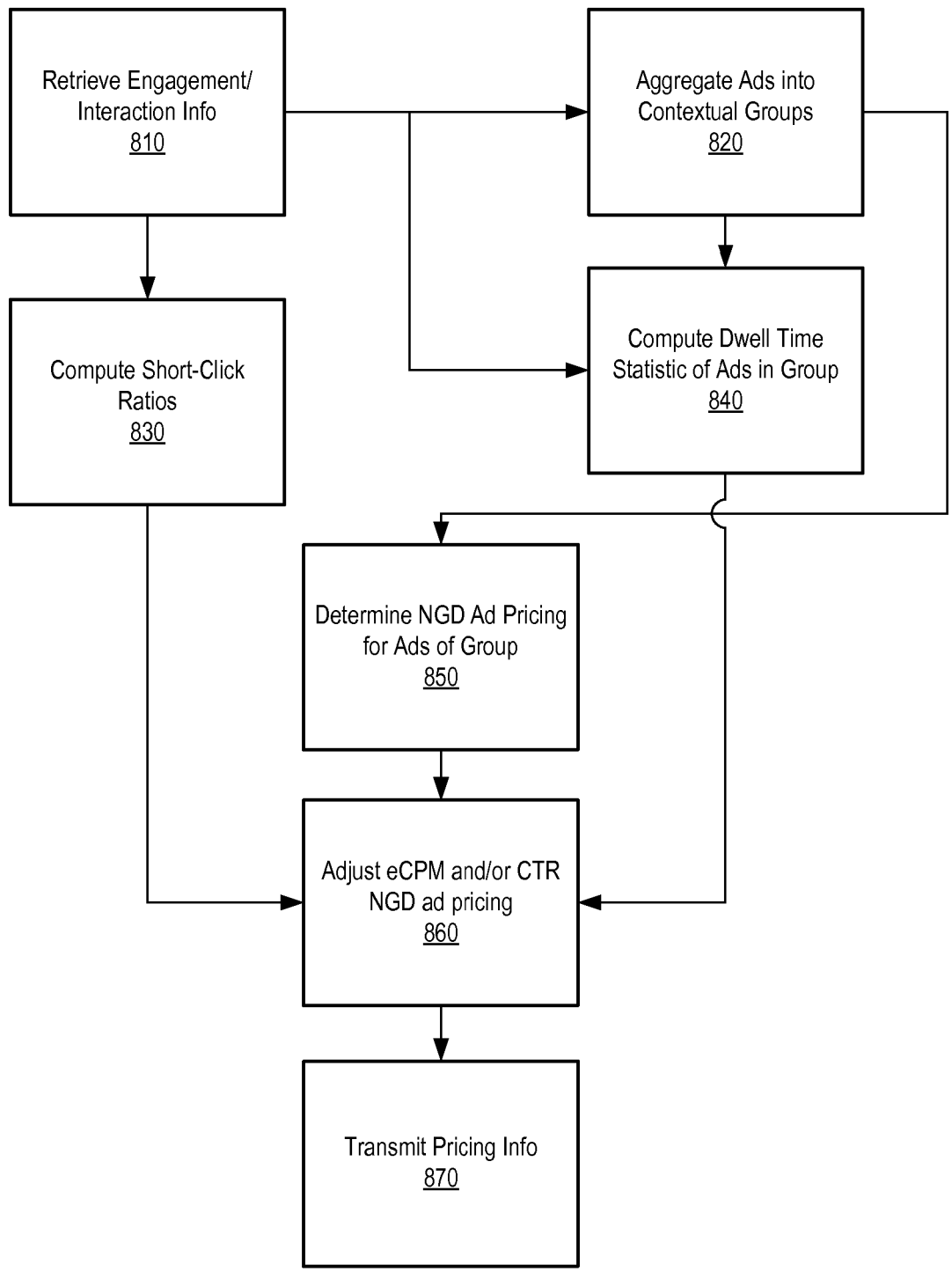
FIG. 8 is an example method for adjusting pricing for advertisements of NGD auctions based on advertisement display context within streamed content.

FIG. 8 is an example method for adjusting pricing for advertisements of NGD auctions based on advertisement display context within streamed content. The method may be executed by the NGD pricing server 118 and may begin by retrieving dwell time (or engagement) information for of users that engage advertisements streamed to the users in a display content stream (810). The method may further include aggregating the advertisements into different groups according to: advertisement category, device on which the advertisement is viewed, and product in which the advertisement is streamed (820).

The method may further include computing short-click ratios of advertisements in each group based on a short-click threshold assigned to the group and the user dwell time information for the group (830). The method may further include determining a dwell time statistic such as average dwell time by users on advertisements in respective groups (840). The method may further include determining NGD pricing for the advertisements in the group (850). The method for may further include adjusting pricing of the advertisements of a group for NGD bidding based on the short-click ratio and the average dwell time of the group, such as to favor groups having higher dwell times and lower short-click ratios (860). The method may end with transmitting the adjusted pricing information to the NGD exchange server 130 for use in an NGD auction (870). As discussed previously, the system 100 and method of the present disclosure may be applied to guaranteed advertisements as well.

Additional Dwell Time Statistics and Examples

In another example, for dwell time analysis on stream advertisements, the statistical analyzer 706 may remove zero ("0") and one ("1") second dwell time records, and then take the logarithm of the remainder dwell times, and store the result into log.dw, creating a bell-shaped histogram of log dwell time of, for example, news on desktop.

The statistical analyzer may then compare log.dw for each creative with all records with a z-test as follows.

a. X is the log.dw for one creative
b. Y is the log.dw for all creatives
c. Compute $$\frac{\text{mean}(x) - \text{mean}(y)}{\sqrt{\frac{\text{var}(x)}{\text{length}(x)} + \frac{\text{var}(y)}{\text{length}(y)}}} \qquad (6)$$

d. Obtain z statistics and p value

Sort the result and pick the creatives that have p value<0.05; Z statistics<0; and have at least 30 dwell time records. This process may be viewed as conducting a statistical hypothesis test to test whether a certain advertising campaign has statistically significant dwell times that are shorter, e.g., worse user engagement, from other campaigns overall when displayed in the same or similar context.

The statistical analyzer 706 may also conduct a return-on-investment (ROI) analysis by computing average ROI on a new stream that matches a current stream. This may happen by applying a test of statistical significance to see if a new stream has a different proportion of short-clicks compared to an existing one. If significant, the statistical analyzer may apply an adjustment to CPC on the new stream, as follows.

Say X1 and Y1 are the short and long clicks on an existing stream.

X2 and Y2 are the short and long clicks on the new stream.

Y1/(X1+Y1)=Y2/[(X2+Y2)*k], where k is the multiplicative adjustment.

so: k=Y2/Y1*(X1+Y1)/(X2+Y2), an adjustment that the bid price adjuster 708 may make based on cross-stream analysis.

The statistical analyzer 706 may also compare content streams in the Yahoo Homepage and News Page, as further examples. To adjust stream effect, the statistical analyzer 706 may compare dwell time between different streams. Bundle category could be a latent variable, so the following exercise is to see if the statistical analyzer is to apply different adjustment for different bundle categories.

Comparing mean of the dwell time of the clicks on home run ("HR") and news stream ("news") may be completed as follows. The statistical analyzer 706 may remove those records that are over 600 seconds or less than 5 seconds, and then take natural logarithm of the dwell times, facilitating generation of average of dwell time. The dwell time of home run is $T_{HR}$ and the dwell time of news stream is $T_{news}$. The time for mean home run stream dwell time ($T_{HR-mean}$) may be calculated as:

$$T_{HR-mean} = e^{\overline{\log T_{HR}}} \qquad (7)$$

The time for mean news stream dwell time ($T_{news-mean}$) may be calculated as:

$$T_{news-mean} = e^{\overline{\log T_{news}}} \qquad (8)$$

The difference may then be calculated between formulas 7 and 8 for different product bundles or property bundles, informing potential NGD price adjustments.

It is intended that the foregoing detailed description be regarded as illustrative rather than limiting, and that it be understood that it is the following claims, including all equivalents, that are intended to define the spirit and scope of this disclosure. Furthermore, the separating of example operation blocks or modules described herein or illustrated in the drawings is not to be construed as limiting these blocks or modules as physically separate devices. Also, each module or operation block described herein may include either computer hardware or a combination of computer hardware and software. For example, each module may include a non-transitory computer readable medium including executable instructions, such as any type of programmable circuit. A programmable circuit may include an application specific integrated circuit (ASIC) and/or a Field Programmable Gate Array (FPGA), for example. Additionally, each module may include memory hardware to store instructions executable by a processor, such as a central processing unit (CPU). Additionally, each module may transmit or receive data by a respective communications interface. The data may be transmitted and received via a network, such as or including the Internet.

The invention claimed is:

1. A method executable by a computer having a processor and a computer-readable memory, comprising executing by the processor, software code stored in the computer-readable memory to configure the computer to perform steps, comprising:
retrieving through a communication interface of the computer, dwell time information for users that engage advertisements streamed to the users in a display content stream;
in response to the retrieved dwell time information of the engaged advertisements, aggregating by the executed software code, using the processor, the advertisements into different groups of different display and online advertisement campaign contexts comprising: advertisement category, device on which the advertisement is viewed, and product in which the advertisement is streamed;
computing, using the processor, short-click ratios of advertisements in each group based on a short-click threshold assigned to the group and the user dwell time information for the group;
determining, using the processor, average dwell time by users on advertisements in respective groups;
adjusting, using the processor, pricing of the advertisements of a group for bidding in a non-guaranteed delivery ("NGD") auction based on the short-click ratio and the average dwell time of the group, such as to favor groups having higher dwell times and lower short-click ratios; and
transmitting through the communication interface of the computer to a content exchange network, the adjusted pricing of the advertisements of the group to an NGD exchange server for participation in an NGD auction, wherein the NGD exchange server is configured to conduct real-time auctions with the advertisements.

2. The method of claim 1, where computing the short-click ratio comprises determining the percentage of time that users engage respective advertisements of the group for a time period less than the short-click threshold.

3. The method of claim 1, where the average dwell time for a group is computed via a statistical analysis selected from the group consisting of a mean, a variance and a median of dwell time distribution of the advertisements of the group.

4. The method of claim 1, where the pricing comprises expected cost-per-thousand impressions (eCPM) pricing, where adjusting the eCPM pricing comprises discounting pricing for a group of advertisements that have a lower average dwell time when compared to another group of advertisements.

5. The method of claim 4, further comprising:
computing a level of discount applied in discounting the advertisements as a ratio of the short-click ratio of the group of advertisements when compared to the short-click ratio of the other group of advertisements.

6. The method of claim 1, where the pricing comprises expected cost-per-thousand impressions (eCPM) pricing, and where an advertiser has set an eCPM pricing for streaming an advertisement in a first product and a first device, further comprising:
dynamically setting an eCPM pricing level for the advertisement streamed in a second product and on a second device for which no bidding price has been supplied by the advertiser based on the short-click ratio and the average dwell time of a group including the first product on the first device and the second product on the second device.

7. A non-transitory computer-readable storage medium comprising computer-executable instructions that, when executed by a computer having a processor and memory, the computer is configured to perform price adjusting for advertisements of non-guaranteed delivery ("NGD") advertising auctions, by:
retrieving through a communication interface of the computer, or using the processor, dwell time information for users that engage advertisements streamed to the users in a display content stream;
in response to the retrieved dwell time information of the engaged advertisements, aggregating by the executed software code, using the processor, the advertisements into different groups of different display and online advertisement campaign contexts comprising: advertisement category, device on which the advertisement is viewed, and product in which the advertisement is streamed;
computing, using the processor, short-click ratios of advertisements in each group based on a short-click threshold assigned to the group and the user dwell time information for the group;
determining, using the processor, average dwell time by users on advertisements in respective groups;
adjusting, using the processor, pricing of the advertisements of a group for NGD bidding based on the short-click ratio and the average dwell time of the group, such as to favor groups having higher dwell times and lower short-click ratios; and
transmitting through the communication interface of the computer to a content exchange network, the adjusted pricing of the advertisements of the group to an NGD exchange server for participation in an NGD auction, wherein the NGD exchange server is configured to conduct real-time auctions with the advertisements.

8. The non-transitory computer-readable storage medium of claim 7, where the average dwell time for a group is computed via a statistical analysis selected from the group consisting of a mean, a variance and a median of dwell time distribution of the advertisements of the group.

9. The non-transitory computer-readable storage medium of claim 7, where the pricing comprises expected cost-per-thousand impressions (eCPM) pricing, where adjusting the eCPM pricing comprises discounting pricing for a group of advertisements that have a lower average dwell time when compared to another group of advertisements.

10. The non-transitory computer-readable storage medium of claim 9, further comprising instructions executable by the processor to compute a level of discount applied in discounting the advertisements as a ratio of the short-click ratio of the group of advertisements when compared to the short-click ratio of the other group of advertisements.

11. The non-transitory computer-readable storage medium of claim 7, where the pricing comprises expected cost-per-thousand impressions (eCPM) pricing, and where an advertiser has set an eCPM pricing for streaming an advertisement in a first product and a first device, further comprising instructions executable by the processor for:

dynamically setting an eCPM pricing level for the advertisement streamed in a second product and on a second device for which no bidding price has been supplied by the advertiser based on the short-click ratio and the average dwell time of a group including the first and second products streamed to different devices.

\* \* \* \* \*